(12) United States Patent
Nunnink et al.

(10) Patent No.: US 10,795,060 B2
(45) Date of Patent: Oct. 6, 2020

(54) SYSTEM AND METHOD FOR REDUCTION OF DRIFT IN A VISION SYSTEM VARIABLE LENS

(71) Applicant: Cognex Corporation, Natick, MA (US)

(72) Inventors: Laurens Nunnink, Simpleveld (NL); Esther Oteo Lozano, Aachen (DE); Jose Fernandez Dorado, Aachen (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/847,868

(22) Filed: Dec. 19, 2017

(65) Prior Publication Data

US 2018/0372985 A1    Dec. 27, 2018

Related U.S. Application Data

(63) Continuation-in-part of application No. 14/271,148, filed on May 6, 2014.

(51) Int. Cl.
*G02B 3/14* (2006.01)
*G06K 7/14* (2006.01)
(Continued)

(52) U.S. Cl.
CPC ............... *G02B 3/14* (2013.01); *G02B 7/04* (2013.01); *G02B 7/14* (2013.01); *G06K 7/10831* (2013.01);
(Continued)

(58) Field of Classification Search
CPC .... H04N 5/23212; H04N 5/2254; G02B 3/12; G02B 3/14; G02B 27/0025;
(Continued)

(56) References Cited

U.S. PATENT DOCUMENTS 5,973,852 A   10/1999   Task
6,081,388 A    6/2000   Widl
(Continued)

FOREIGN PATENT DOCUMENTS

EP   1583354   10/2005
EP   1837689    9/2007
(Continued)

OTHER PUBLICATIONS

Nunnink, "U.S. Appl. No. 14/139,867, Constant Magnification Lens for Vision System Camera", Dec. 23, 2013.
(Continued)

*Primary Examiner* — Twyler L Haskins
*Assistant Examiner* — Akshay Trehan
(74) *Attorney, Agent, or Firm* — Loginov & Associates, PLLC; William A. Loginov

(57) ABSTRACT

This invention provides a vision system that is arranged to compensate for optical drift that can occur in certain variable lens assemblies, including, but not limited to, liquid lens arrangements. The system includes an image sensor operatively connected to a vision system processor, and a variable lens assembly that is controlled (e.g. by the vision processor or another range-determining device) to vary a focal distance thereof. A positive lens assembly is configured to weaken an effect of the variable lens assembly over a predetermined operational range of the object from the positive lens assembly. The variable lens assembly is located adjacent to a front or rear focal point of the positive lens. The variable lens assembly illustratively comprises a liquid lens assembly that can be inherently variable over approximately 20 diopter. In an embodiment, the lens barrel has a C-mount lens base.

19 Claims, 18 Drawing Sheets

(51) Int. Cl.
  *G06K 7/10* (2006.01)
  *H04N 5/232* (2006.01)
  *H04N 5/225* (2006.01)
  *H04N 5/217* (2011.01)
  *G02B 7/14* (2006.01)
  *G02B 7/04* (2006.01)

(52) U.S. Cl.
  CPC ............... *G06K 7/14* (2013.01); *H04N 5/217* (2013.01); *H04N 5/2253* (2013.01); *H04N 5/2254* (2013.01); *H04N 5/23212* (2013.01)

(58) Field of Classification Search
  CPC .... G02B 27/0955; G02B 13/24; G02B 5/005; G02B 7/021; G02B 15/14; G06K 7/10544; G06K 7/14; G06K 7/10831; G06K 7/10821; G06K 7/1439; G03B 3/00; G03B 13/32; G03B 13/34; G03B 13/36
  USPC ..................................... 359/665; 396/79, 89
  See application file for complete search history.

(56) References Cited

U.S. PATENT DOCUMENTS

| | | | |
|---|---|---|---|
| 6,188,526 B1 | 2/2001 | Sasaya | |
| 6,344,930 B1 | 2/2002 | Kaneko | |
| 6,898,021 B1* | 5/2005 | Tang | G02B 3/14 |
| | | | 349/200 |
| 7,296,746 B2 | 11/2007 | Philyaw | |
| 7,296,749 B2 | 11/2007 | Massieu | |
| 7,382,545 B2 | 6/2008 | Jung | |
| 7,436,587 B2* | 10/2008 | Feldman | G02B 3/14 |
| | | | 359/349 |
| 7,453,646 B2 | 11/2008 | Lo | |
| 7,466,493 B2 | 12/2008 | Kim | |
| 7,710,535 B2 | 5/2010 | Nomura | |
| 7,742,075 B2 | 6/2010 | Kimura | |
| 7,755,841 B2 | 7/2010 | Christenson | |
| 7,855,838 B2 | 12/2010 | Jannard | |
| 8,027,095 B2* | 9/2011 | Havens | G06K 7/10702 |
| | | | 359/665 |
| 8,072,689 B2 | 12/2011 | Bolis | |
| 8,154,805 B2 | 4/2012 | Jannard | |
| 8,169,709 B2 | 5/2012 | Jannard | |
| 8,203,628 B2 | 6/2012 | Honjo | |
| 8,284,275 B2 | 10/2012 | Abe | |
| 8,363,149 B2 | 1/2013 | Yumiki | |
| 8,472,122 B2 | 6/2013 | Obu | |
| 8,545,555 B2 | 10/2013 | Berge | |
| 8,576,390 B1 | 11/2013 | Nunnink | |
| 8,794,521 B2 | 8/2014 | Joussen | |
| 2003/0095238 A1 | 5/2003 | Imafuku | |
| 2004/0228003 A1 | 11/2004 | Takeyama | |
| 2006/0047039 A1 | 3/2006 | Kato | |
| 2006/0257142 A1 | 11/2006 | Tanaka | |
| 2007/0170259 A1 | 7/2007 | Nunnink | |
| 2007/0216851 A1 | 9/2007 | Matsumoto | |
| 2008/0055425 A1 | 3/2008 | Kuiper | |
| 2008/0062529 A1 | 3/2008 | Helwegen | |
| 2008/0231966 A1 | 9/2008 | Hendriks | |
| 2008/0277477 A1 | 11/2008 | Thuries | |
| 2008/0277480 A1* | 11/2008 | Thuries | G06K 7/10702 |
| | | | 235/472.01 |
| 2009/0072037 A1* | 3/2009 | Good | G02B 3/14 |
| | | | 235/462.35 |
| 2009/0141365 A1 | 6/2009 | Jannard | |
| 2009/0302197 A1 | 12/2009 | Uchino | |
| 2010/0039709 A1 | 2/2010 | Lo | |
| 2010/0231783 A1* | 9/2010 | Bueler | G02B 3/14 |
| | | | 348/347 |
| 2010/0243862 A1 | 9/2010 | Nunnink | |
| 2010/0276493 A1 | 11/2010 | Havens | |
| 2010/0322612 A1 | 12/2010 | Tsuda | |
| 2011/0158634 A1 | 6/2011 | Craen | |
| 2011/0176221 A1 | 7/2011 | Tanaka | |
| 2011/0229840 A1 | 9/2011 | Liang | |
| 2011/0274372 A1 | 11/2011 | Bianchi | |
| 2012/0105707 A1 | 5/2012 | Futami | |
| 2012/0143004 A1 | 6/2012 | Gupta | |
| 2012/0160918 A1 | 6/2012 | Negro | |
| 2012/0200764 A1* | 8/2012 | Afshari | H04N 5/2254 |
| | | | 348/345 |
| 2012/0261474 A1* | 10/2012 | Kawashime | G02B 3/14 |
| | | | 235/462.24 |
| 2012/0261551 A1 | 10/2012 | Rogers | |
| 2012/0281295 A1 | 11/2012 | Jannard | |
| 2013/0021087 A1 | 1/2013 | Rosset | |
| 2014/0183264 A1 | 7/2014 | Nunnink | |
| 2014/0268361 A1 | 9/2014 | Nunnink | |
| 2015/0323709 A1 | 11/2015 | Nunnink | |

FOREIGN PATENT DOCUMENTS

| | | |
|---|---|---|
| JP | H0527165 | 2/1993 |
| JP | 2004029685 | 1/2004 |
| JP | 2006520007 | 8/2006 |
| JP | 2009505543 | 2/2009 |
| JP | 2011218156 | 11/2011 |
| WO | 2004083899 | 9/2004 |
| WO | 2007020451 | 2/2007 |

OTHER PUBLICATIONS

Nunnink, et al., "U.S. Appl. No. 13/800,055, filed Mar. 13, 2013, Lens Assembly With Integrated Feedback Loop for Focus Adjustment", Mar. 13, 2013.

* cited by examiner

SYSTEM AND METHOD FOR REDUCTION OF DRIFT IN A VISION SYSTEM VARIABLE LENS

RELATED APPLICATION

This application is a continuation-in-part of co-pending U.S. patent application Ser. No. 14/271,148, entitled SYSTEM AND METHOD FOR REDUCTION OF DRIFT IN A VISION SYSTEM VARIABLE LENS, filed May 6, 2014, the teachings of which are expressly incorporated herein by reference.

FIELD OF THE INVENTION

This application relates to cameras used in machine vision and more particularly to automatic focusing lens assemblies.

BACKGROUND OF THE INVENTION

Vision systems that perform measurement, inspection, alignment of objects and/or decoding of symbology (e.g. bar codes, or more simply "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader, the user or automated process acquires an image of an object that is believed to contain one or more IDs. The image is processed to identify ID features, which are then decoded by a decoding process and/or processor to obtain the inherent information (e.g. alphanumeric data) that is encoded in the pattern of the ID.

Often, a vision system camera includes an internal processor and other components that allow it to act as a standalone unit, providing a desired output data (e.g. decoded symbol information) to a downstream process, such as an inventory tracking computer system or logistics application.

An exemplary lens configuration that can be desirable in certain vision system applications is the automatic focusing (auto-focus) assembly. By way of example, an auto-focus lens can be facilitated by a type of "variable lens" assembly (defined further below), known as a so-called liquid lens assembly. One form of liquid lens, available from Varioptic of France uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other auto-focus mechanisms, the liquid lens has extremely fast response times. It is also ideal for applications with reading distances that change from object-to-object (surface-to-surface) or during the changeover from the reading of one object to another object—for example in scanning a moving conveyor containing differing sized/height objects (such as shipping boxes). In general, the ability to quickly focus "on the fly" is desirable in many vision system applications.

A recent development in liquid lens technology is available from Optotune AG of Switzerland. This lens utilizes a movable membrane covering a liquid reservoir to vary its focal distance. A bobbin exerts pressure to alter the shape of the membrane and thereby vary the lens focus. The bobbin is moved by varying the input current within a preset range. Differing current levels provide differing focal distances for the liquid lens. This lens advantageously can provide a larger aperture (e.g. 6 to 10 millimeters) than competing designs (e.g. Varioptic of France) and operates faster. However, due to thermal drift and other factors, there may be variation in calibration and focus setting during runtime use, and over time in general. A variety of systems can be provided to compensate and/or correct for focus variation and other factors. However, such compensation routines can require processing time (within the camera's internal processor) that slows the lens' overall response time in arriving at a new focus. Likewise, such compensation routines, (e.g. thermal drift) can be standardized, and not customized to the lens' intrinsics, rendering them less reliable for the specific drift conditions that a lens may encounter over time. Note that drift in a liquid lens can be, for example, approximately 0.15 Diopter/°C. (i.e. for certain Varioptic liquid lenses currently in production and/or specified in commercially available products). Some vision applications, especially when small features at a large distance are to be detected, require a stability in optical power of the imager lens of +/−0.1 diopter.

Also it is recognized generally that a control frequency of at least approximately 1000 Hz may be required to adequately control the focus of the lens and maintain it within desired ranges. This poses a burden to the vision system's processor, which can be based on a DSP or similar architecture. That is, vision system tasks would suffer if the DSP were continually preoccupied with lens-control tasks. All of these disadvantages make drift compensation a challenge in many applications.

SUMMARY OF THE INVENTION

This invention overcomes disadvantages of the prior art by providing a vision system that is arranged to compensate for optical drift that can occur in certain lens assemblies capable of varying optical power, wherein the optical power (and hence, varying focal length/distance where focal length=1/optical power) is varied by controlling lens shape and/or lens refractive index. Such lens assemblies include, but are not limited to, liquid lens arrangements employing, for example, two iso-density fluids or a flexible membrane—also generally termed a "variable lens" assembly herein. The system includes an image sensor operatively connected to a vision system processor, and a variable lens assembly that is controlled (e.g. by the vision processor or another range-determining device) to vary a focal distance thereof. A positive lens assembly is configured to weaken an effect of the variable lens assembly over a predetermined operational range of the object from the positive lens assembly. The variable lens assembly illustratively comprises a liquid lens assembly, and such a liquid lens assembly can be inherently variable over approximately 20 diopter. Illustratively, the positive lens assembly and the variable lens assembly are collectively housed in a removable lens barrel with respect to a camera body and the image sensor. The image sensor is illustratively located within the camera body. Likewise, the vision processor can be all, or in part, located in the camera body. In an embodiment, the lens barrel has a C-mount lens base, and the positive lens assembly comprises a doublet, which includes a front convex lens and rear concave lens. The positive lens assembly can define an effective focal range of 40 millimeters. Illustratively, the usable focal length of the lens (e.g. a doublet) is between approximately 10 and 100 millimeters. Additionally, the variable lens assembly (e.g. liquid lens assembly) is typically located adjacent to, but remote from, a focal point of the positive lens assembly, which can be the front, or more typically, the back/rear focal point of the positive lens assembly. The distance between the variable lens assembly and the focal point can be between approximately 0.1 and 0.5 times a focal length F of the positive lens assembly. In this manner, the positive lens assembly and the variable lens assembly are part of an overall lens assembly focusing light on the image sensor. The optical power of the positive lens assembly, thus, "predominantly defines" an overall optical power of the overall lens assembly—in other words, the majority of magnification/optical power is provided by the positive lens assembly, thereby minimizing the effect of drift in the variable lens assembly.

In an illustrative embodiment a vision system that compensates for drift is provided. The vision system includes an image sensor operatively connected to a vision system processor, a variable lens assembly that varies a shape or a refractive index thereof, and a fixed lens assembly configured to weaken an effect of the variable lens assembly over a predetermined operational range of the object. Illustratively, the variable lens assembly comprises a liquid lens assembly. It can be positioned between the image sensor and the fixed lens assembly and can be variable over approximately 20 diopter. Additionally, the fixed lens assembly can define a positive optical power. Illustratively, the fixed lens assembly and the variable lens assembly are housed in a removable lens barrel with respect to a camera assembly body and the image sensor, the image sensor can be located within the camera assembly body. The camera assembly body can be electrically connected to the variable lens assembly to provide at least one of power and control thereof, by at least one of contact pads and a cable assembly. The fixed lens assembly can comprise one of: (a) a front lens with a front concave surface and a rear convex surface and a central biconvex lens spaced from the front lens, (b) a front biconvex lens and a rear stacked lens assembly with a front positive lens, center biconcave lens and rear positive lens, (c) a front planoconcave lens and a negative lens, a central stacked lens assembly with a biconvex lens and a planoconvex lens, and a rear biconvex lens and positive lens, (d) a front planoconvex lens and positive lens and a rear positive lens and negative lens, and (e) a front stacked lens assembly with a biconvex lens and biconcave lens and a rear planoconvex lens and negative lens. Also, at least one lens of the fixed lens assembly can comprise a polymer material. By way of example, the fixed lens assembly can define an effective usable focal range of between approximately 0.3 to 8 meters. Also by way of example, the variable lens assembly can be located adjacent to a focal point of the fixed lens assembly. The focal point is one of either a front focal point or a back focal point of the fixed lens assembly. In embodiments, the fixed lens assembly can comprise a front lens assembly and a rear lens assembly with the variable lens assembly positioned therebetween, in which the rear lens assembly can define a positive optical power. Also in such embodiments, the front lens assembly can have a pair of lenses, each having convex front surfaces and concave rear surfaces and a lens having opposing concave surfaces, and the rear lens assembly can have a lens having opposing convex surfaces. Illustratively, the fixed lens assembly and the variable lens assembly are part of an overall lens assembly focusing light on the image sensor, in which an optical power of the fixed lens assembly predominantly defines an overall optical power of the overall lens assembly.

In another illustrative embodiment, a variable lens system for a vision system having an image sensor that transmits image data to a processor is provided. The system includes a variable lens assembly (such as a liquid lens assembly. The system includes a fixed lens assembly having a focal point. The variable lens assembly is located adjacent to the focal point. The fixed lens assembly and the variable lens assembly can be part of an overall lens assembly focusing light on the image sensor. The optical power of the positive lens assembly can predominantly define the overall optical power of the overall lens assembly. Illustratively, the liquid lens assembly is variable over approximately 20 diopter. In embodiments, the fixed lens and the variable lens assembly are housed in a removable lens barrel with respect to a camera assembly body and the image sensor. The image sensor is located within the camera assembly body. The camera assembly body can be electrically connected to the variable lens assembly, to provide at least one of power and control thereof, by at least one of contact pads and a cable assembly. Illustratively, the lens system can comprise one of: (a) a front lens with a front concave surface and a rear convex surface and a central biconvex lens spaced from the front lens, (b) a front biconvex lens and a rear stacked lens assembly with a front positive lens, center biconcave lens and rear positive lens, (c) a front planoconcave lens and a negative lens, a central stacked lens assembly with a biconvex lens and a planoconvex lens, and a rear biconvex lens and positive lens, (d) a front planoconvex lens and positive lens and a rear positive lens and negative lens, and (e) a front stacked lens assembly with a biconvex lens and biconcave lens and a rear planoconvex lens and negative lens.

BRIEF DESCRIPTION OF THE DRAWINGS

The invention description below refers to the accompanying drawings, of which.

DETAILED DESCRIPTION

I. System Overview

Figure 1:
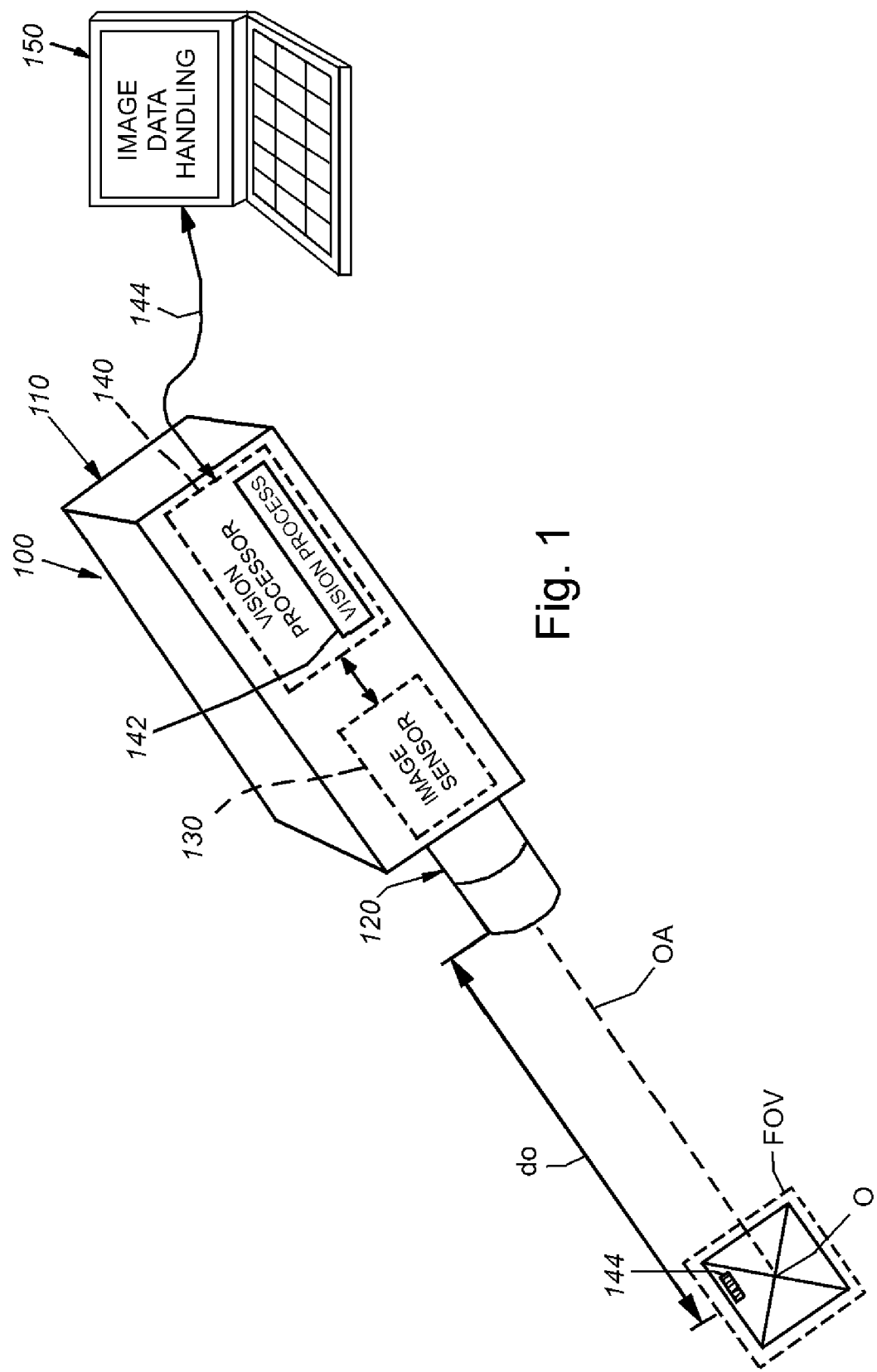
FIG. 1 is a diagram of an illustrative vision system arrangement having a vision system camera with associated vision processor, with a lens assembly that compensates for inherent drift over time, shown acquiring images of an exemplary object in a scene according to an illustrative embodiment.

FIG. 1 details a vision system 100 that includes a vision system camera assembly 110 and associated lens unit/assembly 120. The construction of the lens unit 120 is described further below. In an embodiment, the lens unit 120 is fixed to the camera, or can be removable using a custom or conventional mount base, such as the well-known Cine or "C-mount". The camera includes a body/housing that can house a plurality of operational components including an image sensor or imager 130 (shown in phantom). In this embodiment, the imager 130 is operatively connected with an on-board vision processor 140 that operates a variety of hardware and/or software processes, generally termed a vision process 142. The vision process 142 can include a plurality of software applications that are adapted to perform general purpose or specialized vision system tasks, for example, ID (code) finding and decoding tasks, edge detection, blob analysis, surface inspection, robot manipulation and/or other operations. See, for example exemplary ID 144. The processes 142 can include various image acquisition and image manipulation applications as well—which place image data into a form more appropriate for use in vision system tasks—e.g. histogramming, thresholding, etc. These tasks and processes are known to those of skill in the art and can be sourced from a commercial vision system supplier—such as Cognex Corporation of Natick, Mass. As shown, the illustrative vision system processor 140 is contained within the camera body. Vision system data in "raw", pre-processed (e.g. found, undecoded ID image data), or fully processed (e.g. decoded ID data) form can be provided over a wired and/or wireless link 144 to an appropriate data-handling system or processor, such as a standalone PC or server system. Alternate systems, such as mobile computing devices, cloud-based devices, and the like can be provided in alternate implementations. The data-handling system stores and manipulates the image-based data as desired by the user—e.g. quality or inventory control. In alternate embodiments, some or all of the vision system processors/processes can be instantiated and/or performed in a remote processor (e.g. the computing device/processor 150) that is interconnected to the camera 110 by an appropriate wired and/or wireless link (e.g. link 144) in a manner known to those of skill in the art.

Note, as used herein, the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. In a system arrangement, such processes/process functions can be termed as occurring/existing in a corresponding "module" or "element". For example, an "ID-reading module", which performs the functions associated with reading and/or decoding of ID codes.

The lens assembly 120 is shown aligned along the optical axis OA (with the plane of the sensor 130) typically arranged perpendicularly to the axis. The lens assembly 120 and sensor 130 image an object O. The object O, by way of example, can be any two-dimensional (2D) or three-dimensional (3D) surface or shape that partially or fully fits within the field of view (FOV). In the depicted example, range/distance (do) of the object O from the camera 110 (e.g. from the focal plane of the sensor 130) can be varied, but defines a predetermined operating range (according to an illustrative embodiment) within which to image the object O.

Illustratively, this embodiment compensates for potential optical drift over time in a variable lens (e.g. a liquid lens) that is part of the overall lens assembly 120 by defining an operating range for the vision system at which the influence of the optical power of the variable lens on the optical power of the overall lens assembly (including any fixed lenses therein) is reduced. In this manner, drift is a small component of the overall focal performance of the lens assembly. This illustrative arrangement provides benefits where the adjustable focus range can be reduced. Thus, this system is useful in various embodiments—such as those where the distance (do) of the object surface from the focal plane is relatively constant, or this distance (do) varies over a small relative distance. Illustratively, the system can be employed in vision system applications that read at larger distances, wherein the required optical range is only a small fraction (approximately 2 diopter) of the specified range of commercially available liquid lenses (20 diopter). As described above, the variable lens assembly of the embodiments contemplated herein can include a variety of lens types that are capable of varying optical power. More particularly, in embodiments, the optical power (and hence, varying focal length/distance where focal length=1/optical power) is varied by controlling the lens shape and/or the lens refractive index. Such variable lens assemblies include, but are not limited to, liquid lenses, and a variety of liquid lens types can be employed including iso-density fluid types (Varioptic), membrane types (Optotune), etc. Likewise, variable lenses that operate using other mechanisms, such as electro-mechanical actuation, can be employed.

II. Drift-Reduction Lens Arrangement

Figure 2:
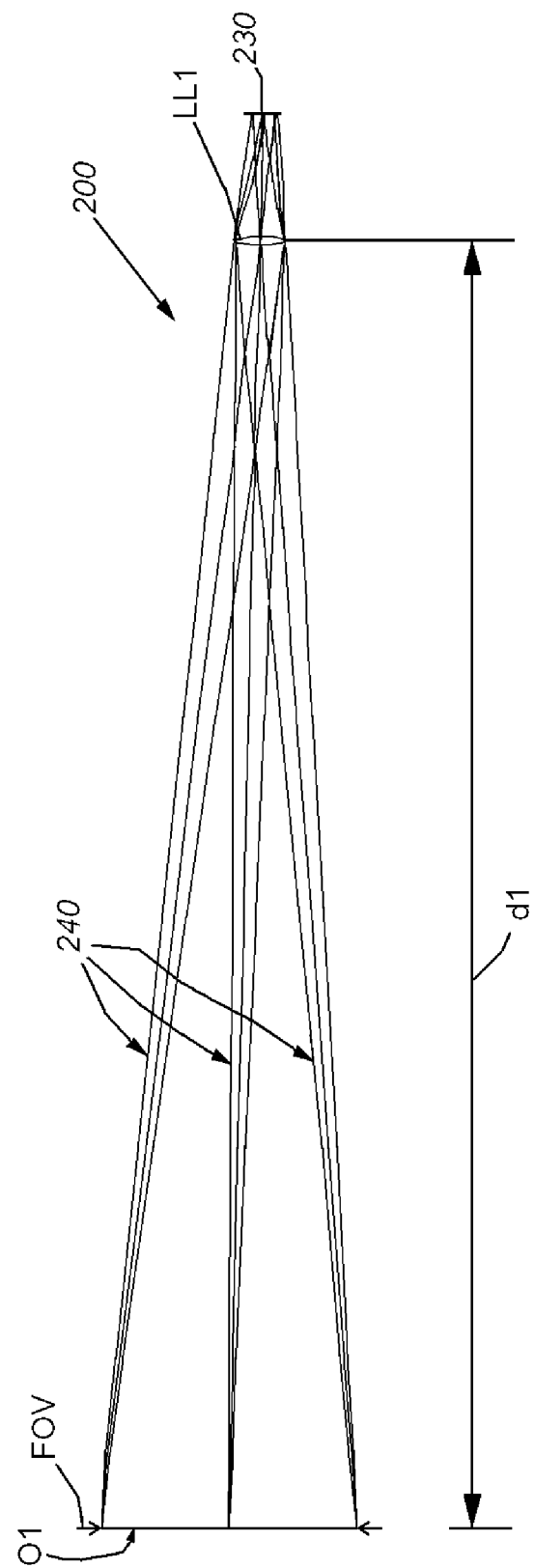
FIG. 2 is a diagram of the ray trace for an exemplary lens system that includes a variable lens assembly imaging an object.

By way of further illustration of the concepts of an embodiment, FIG. 2 depicts a ray trace diagram of a basic optics arrangement for an exemplary vision system 200 with an exemplary object O1, image sensor 230 and generalized variable lens (e.g. a liquid lens (LL1)). The object O1 is positioned at a distance d1 from the variable lens LL1. This system is free of additional lenses and the rays 240 reflected from the object O1 pass through the variable lens LL1 and are focused directly on the image sensor 130 as shown. Thus, any minor variation (for example, from drift) in the focus of the variable lens LL1 results in a potentially significant out-of-focus condition that can affect the ability of the vision system to render a proper result.

Figure 3:
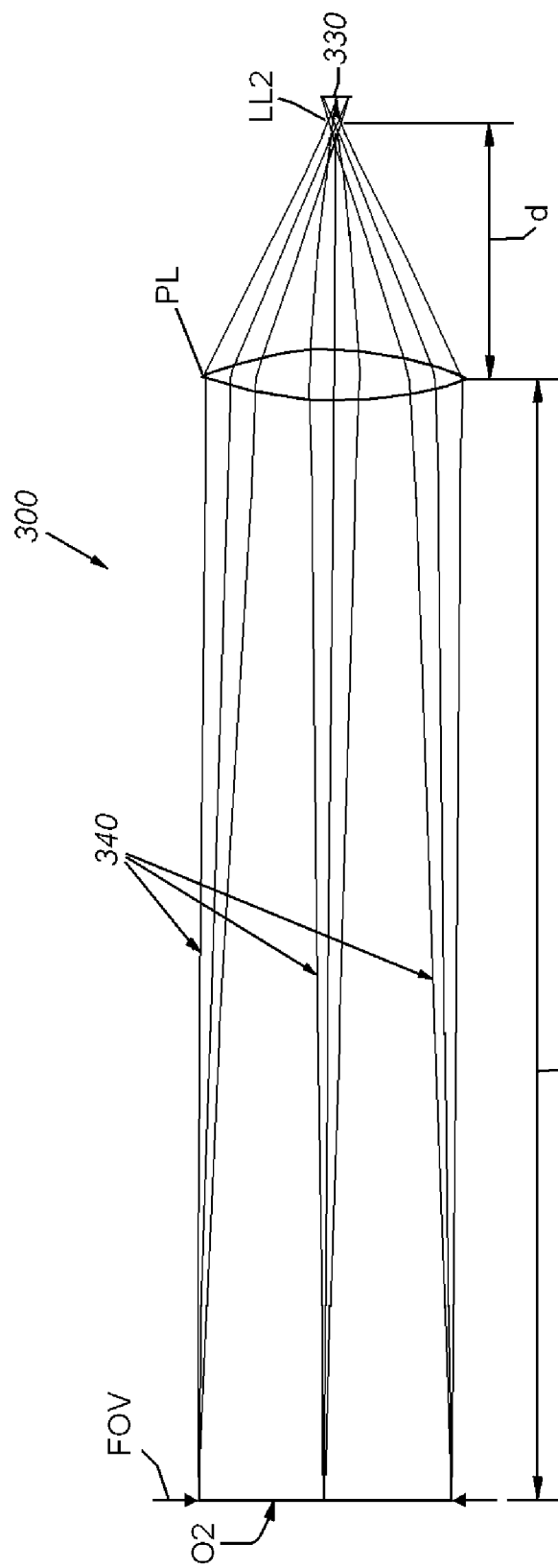
FIG. 3 is a diagram of the ray trace for an illustrative lens system including a variable lens assembly and a positive lens assembly is positioned along the optical axis at a predetermined distance from the variable lens assembly, to thereby provide a drift-tolerant lens system.

To address such sensitivity to drift and other focal variations in e.g. a liquid lens, reference is now made to FIG. 3, which shows a generalized optical arrangement for a vision system 300 according to an embodiment. A fixed (non-variable) positive lens PL is located at a predetermined distance d in front of the variable (e.g. liquid) lens assembly LL2, along the optical path between the system and imaged object O2.

Thus, the optical power A of this system 300 (where A1 is the optical power of the positive lens assembly PL, A2 is the optical power of the variable lens assembly LL2 and d is the distance between the positive lens PL and the variable lens LL2) is:

$$A=A1+A2-d*A1*A2$$

If the distance between the variable lens LL2 and the positive lens PL is relatively large, (e.g. d=k/A1 (where k=0.5 . . . 0.9, and represents the product of the power of the positive lens A1 and distance d; i.e. k=d*A1)), then the overall optical power A of the above-defined system of lenses with powers A1 and A2, and relative distance d can be written as:

$$A=A1+(1-k)*A2$$

and the drift, represented as a differential of lens optical power (dA) per unit temperature (dT) (dA/dT) of the system is:

$$dA/dT=dA1/dT+(1-k)*dA2/dT$$

meaning that the drift of the over system dA/dT equals the sum of the drift of the positive lens dA1/dT and (1−k) times the drift of the variable lens dA2/dT.

In an embodiment, the fixed positive lens PL can be chosen as a glass lens with inherently low drift (i.e. dA1/dT≈0), so compared to the original setup in FIG. 2, it follows that the overall drift dA/dT of the system of FIG. 3 is effectively reduced by a factor 1−k (=0.1x . . . 0.5x) using the positive lens PL, and the larger power the positive lens (i.e. larger k), the greater the drift reduction in the variable lens.

Figure 4:
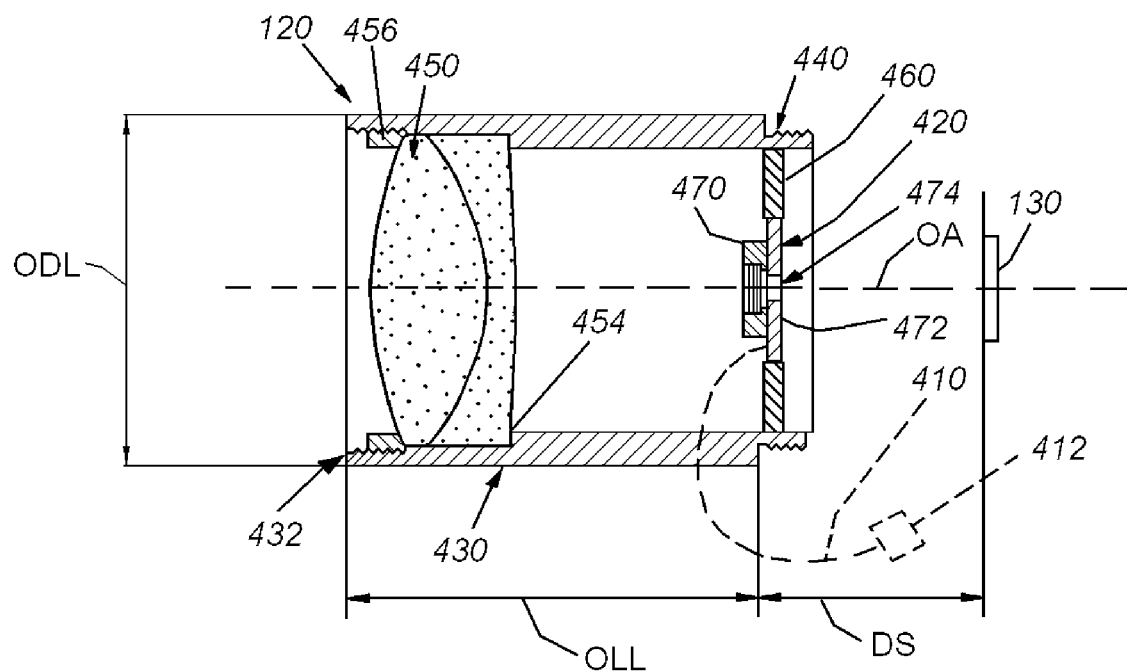
FIG. 4 is a side cross section of a lens unit including a variable lens assembly and positive lens exhibiting drift tolerance according to an illustrative embodiment, showing relative dimensions of the lens barrel and components associated therewith.

Reference is now made to FIG. 4, which details a cross section of an integrated lens unit/assembly 120 for use in the illustrative vision system camera 110 of FIG. 1. This lens assembly 120 can include various electrical connections and/or leads (shown schematically in phantom as cable 410 and connector 412) that extend from the variable (e.g. liquid) lens assembly 420 to a location on the body of the camera 110 in communication with appropriate control processors/components that are associated with the vision processor 140. Note that the exemplary liquid lens assembly 420, which can be a membrane-type, iso-density fluid-type or equivalent, is contained within a barrel 430 and the lead 410 is constructed to extend from a location on the barrel 430. This connection allows control signals to power the liquid lens assembly (e.g. current and/or voltage modulation) to enable the variation and setting of the focus of the liquid lens assembly 420 in response to commands of the processor. Proper focus can be determined and/or set using a variety of techniques known to those of skill—for example using the crispness of imaged edges after stepping through various focus settings and/or using an external range-finding device. While the use of a separate cable link, with associated connector on the body of the camera is employed in the depicted embodiment, the connection arrangement can be internal to the barrel 430—for example consisting of aligned contact pads and/or contact rings (on the lens and camera body) that interconnect when the lens assembly 120 is secured to the camera body.

The lens assembly barrel 430 is sized and arranged in this embodiment with the form factor of a conventional C-mount lens, having an appropriately threaded base 440. The depicted external thread of the barrel base (flange) 440 is adapted to mate with a corresponding internal thread (not shown) on the camera body. The thread size is conventional (e.g. 1 inch×32). Note that the camera body can include a variety of accessories and functional components, such as a ring illuminator surrounding the lens and/or connections for an external illumination assembly. Such accessories and/or components can be applied to the camera to accomplish specific vision system tasks. The barrel 430 can be constructed from a variety of materials such as cast or machined aluminum alloy. The threaded base allows the barrel, and associated overall lens assembly contained therein, to be removably attached to the camera body and replaced with other types of lenses at the option of either the manufacturer or user. While the form factor of a C-mount base is used in this embodiment, any acceptable lens base form that allows accommodation of a liquid lens or other appropriate variable lens can be employed in alternate embodiments. For example, an F-mount lens base can be employed.

The dimensions of the lens barrel 430 are shown by way of non-limiting example in FIG. 4. As depicted, the barrel outer diameter ODL can be approximately 28-29 millimeters in an embodiment. This addresses the general size constraints/parameters of a C-mount lens. Likewise, the length OLL of the barrel 430 from front end 432 to the threaded base 440 is illustratively, approximately 32-34 millimeters. The distance DS from the lens base 440 to the focal plane of the image sensor 130 is approximately 17.5 millimeters. Note that these dimensions are illustrative of a wide range of possible relationships that are known to those of skill.

Figure 4A:
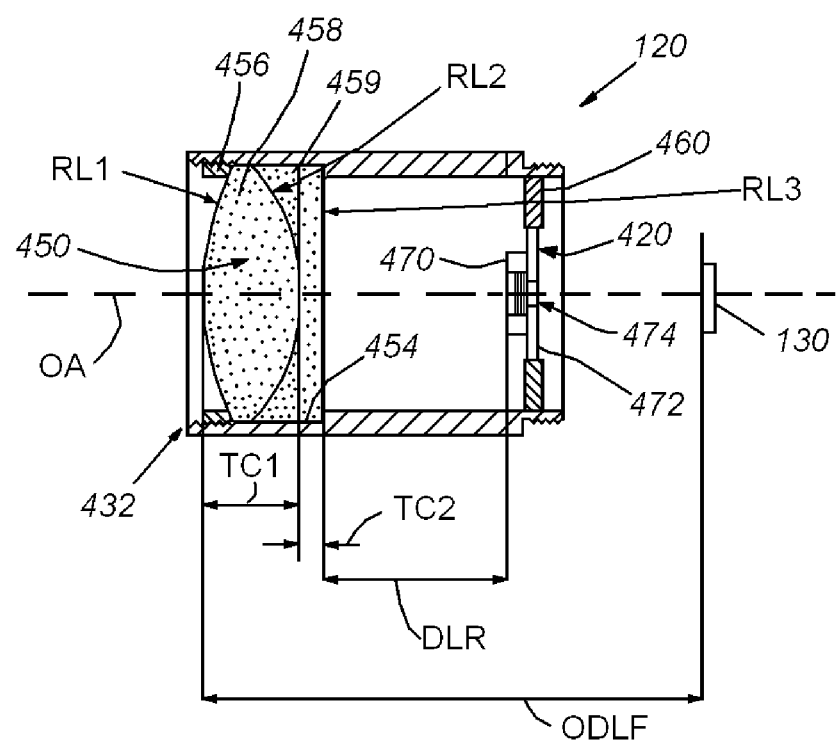
FIG. 4A is a side cross section of the lens unit of FIG. 4, showing the relative placement of components along the optical axis.

With further reference to FIG. 4A, the positioning of the internal optical components of the lens is described in detail. A positive lens assembly 450, having a relatively large diameter with respect to the variable lens (420) diameter, is located adjacent to the front end 432 of the barrel 430. This positive lens assembly (also termed the "positive lens") 450 is seated within a recess 454 formed at the front end of the barrel. The positive lens 450 is secured at its front side by a threaded ring 456. Note that this arrangement is highly variable in alternate embodiments, and a variety of mounting and/or attachment mechanisms can be employed in alternate embodiments. The positive lens 450 is an achromatic doublet, defining an effective focal length (f) of 40 mm and a back focal length of 33.26 millimeters. The clear aperture is 24 millimeters. The overall lens assembly diameter is 25 millimeters. Illustratively, it consists of a front, convex lens 458 and a rear, concave lens 459. The convex lens 458 defines a front radius RL1 of 27.97 millimeters and rear radius RL2 of −18.85 millimeters (where positive and negative radii represent directions with respect to the orientation of the imaged object, with positive radii oriented toward the object and negative radii oriented toward the image sensor). The concave lens 459 defines a front radius (also RL2) of 18.85 millimeters (complimenting the mating surface of the convex lens 458) and a rear radius RL3 of 152.94 millimeters. The convex lens 458 has a center thickness TC1 (along the optical axis OA) of 9.5 millimeters and the concave lens has a center thickness TC2 of 2.5 millimeters. These dimensions are highly variable in alternate embodiments. The above-described embodiment and associated dimensions of a positive lens (e.g. doublet) assembly 450 is commercially available from Edmund Optics Inc. of Barrington, N.J. as stock number 32321. In this embodiment, the lens front-to-sensor plane distance ODLF is approximately 49 millimeters according to an embodiment. It should be clear that the positive lens' dimensions and/or the arrangement of components are highly variable in alternate embodiments.

The variable (e.g. liquid) lens assembly (which can be sourced from a variety of manufacturers) 420 is positioned adjacent to the rear end of the lens barrel 430. In this embodiment, and by way of non-limiting example, the variable lens assembly 420 can comprise a model Arctic 416 liquid lens available from Varioptic of France. The exemplary variable lens assembly has a focus range of approximately 20 diopter (i.e. 5 centimeters to infinity), a diameter of 7.75 millimeters and a thickness (along the optical axis) of 1.6 millimeters. The depicted, exemplary, liquid lens assembly 420 consists of the lens unit 470, which is mounted on a controller circuit board 472, having a central aperture 474, aligned along the optical axis through which focused light passes onto the sensor 130.

The lens assembly 130 can be supported within the barrel 430 using an integral or unitary spacer, shoulder arrangement and/or support structure 460. The support structure 460 ensures that the variable lens assembly 420 remains fixed in an appropriate alignment with respect to the optical axis OA. The distance DLR from the positive lens rear to the front of the variable lens unit 470 is 18.0 millimeters in this embodiment. Note that the image sensor 130 can define a conventional ½ inch-size CMOS sensor (6.9 millimeters (horizontal) by 5.5 millimeters (vertical)—SW in FIG. 5) in an embodiment.

Figure 5:
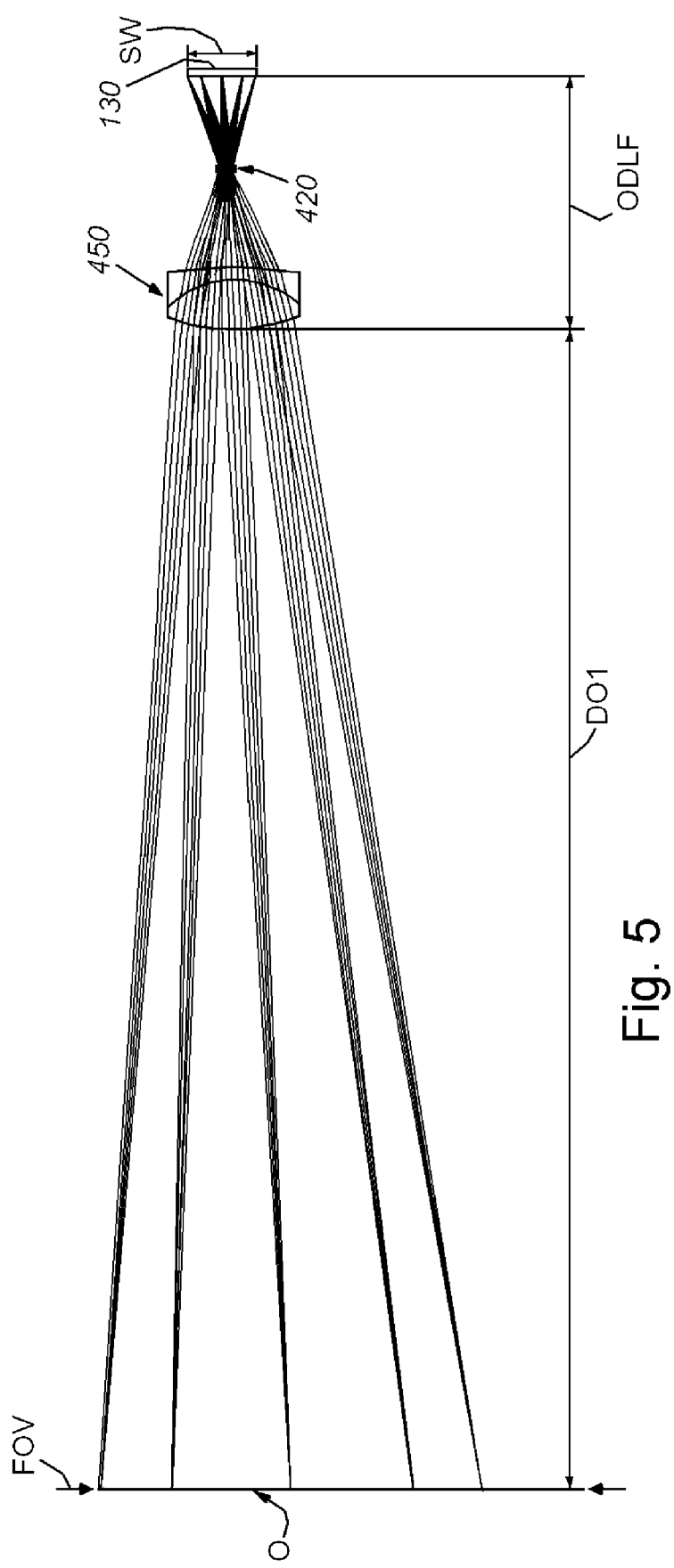
FIG. 5 is a diagram of the ray trace for the illustrative lens unit of FIG. 4, shown imaging an object at a first distance.
Figure 6:
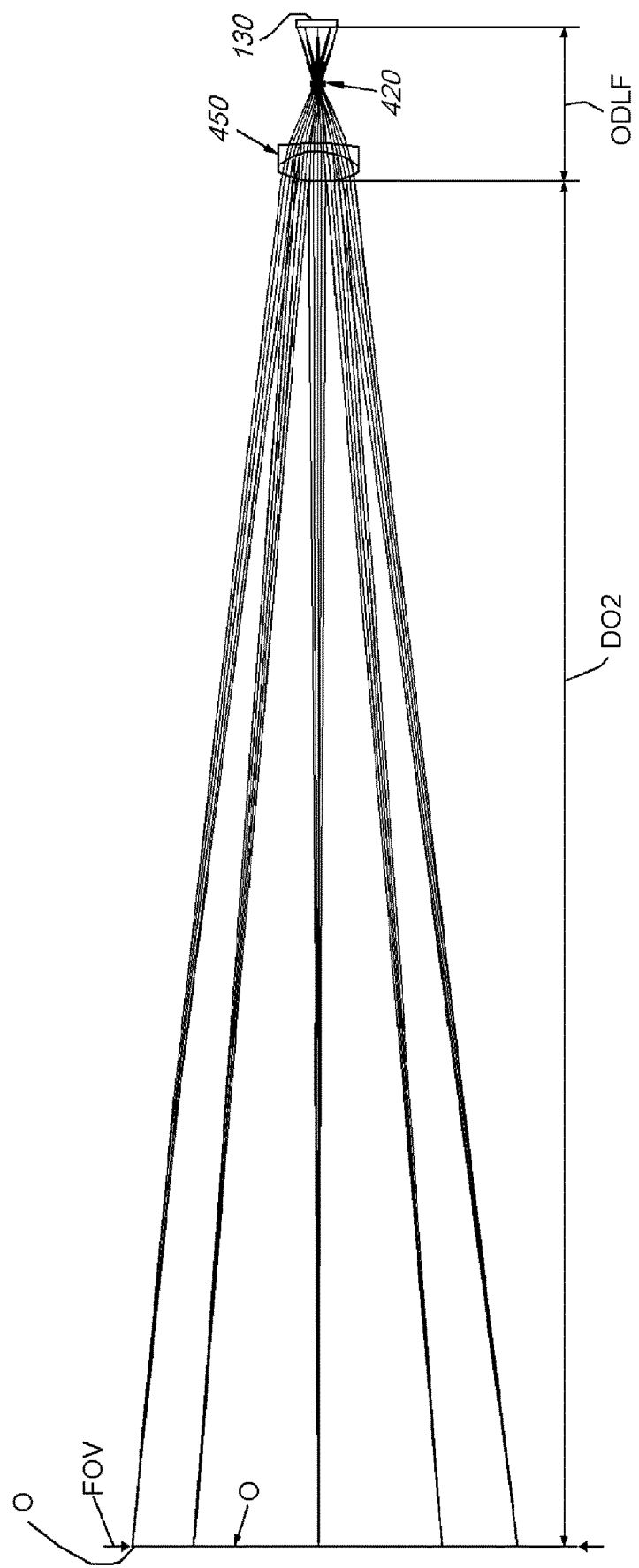
FIG. 6 is a diagram of the ray trace for the illustrative lens unit of FIG. 4, shown imaging an object at a second distance, longer than the first distance.
Figure 7:
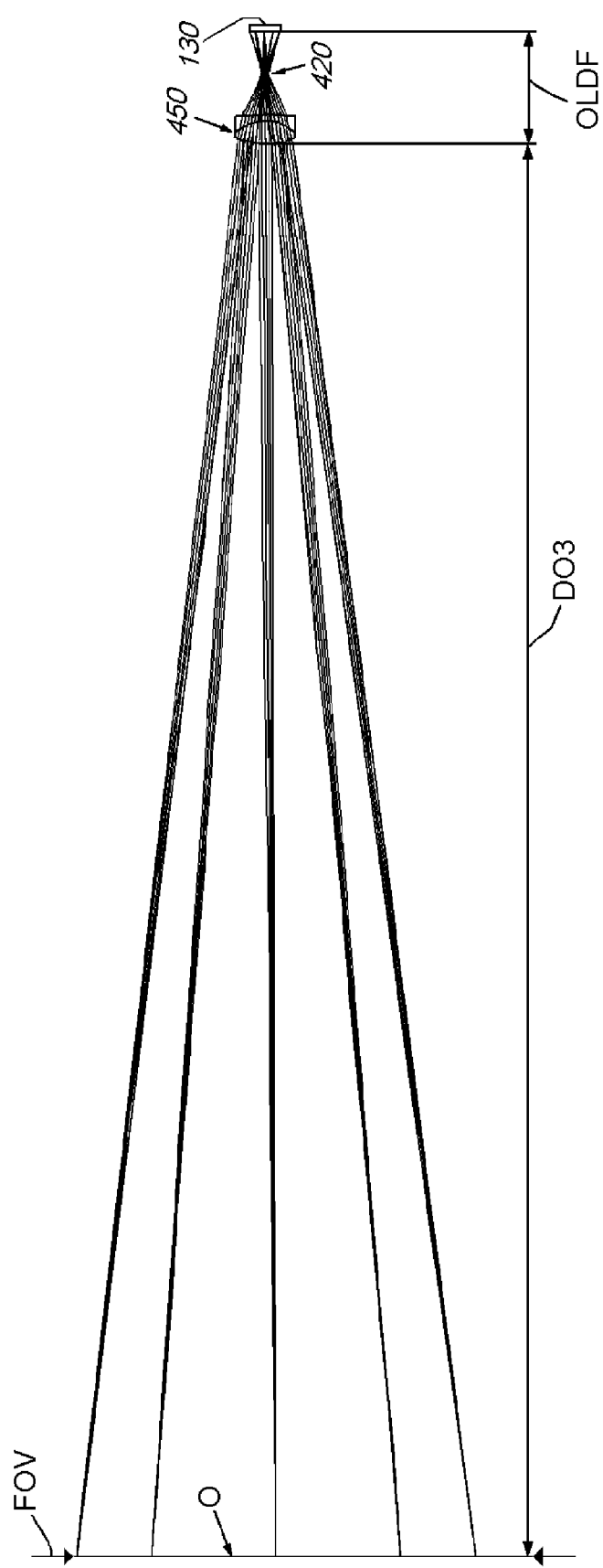
FIG. 7 is a diagram of the ray trace for the illustrative lens unit of FIG. 4, shown imaging an object at a first distance.

Reference is now made to FIGS. 5-7, which show the vision system and lens assembly in operation at a plurality of focal distances within the operational range of the system. The object O is thus located at three exemplary distances DO1, DO2 and DO3 in each of ray trace diagrams of FIGS. 5, 6 and 7, respectively. By way of example, DO1 is approximately 219 millimeters, DO2 is approximately 430 millimeters, and DO3 is approximately 635 millimeters. Within this range, the optical power of the variable lens assembly is varied from +10.73 diopter for F=37.4 millimeters (FIG. 5); to +0.32 diopter for F=39.8 millimeters (FIG. 6); to −3.81 diopter for F=42.3 millimeters. This 219 to 635-millimeter focal range is associated with a 6.9 diopter variation. By way of comparison, a system mounting with the depicted variable lens assembly in a conventional arrangement with the variable lens attached at close distance of the front lens typically requires a 3.3 diopter variation. Thus, the illustrative system effectively reduces potential drift by more than a factor of 2 relative to a conventional arrangement.

Figure 8:
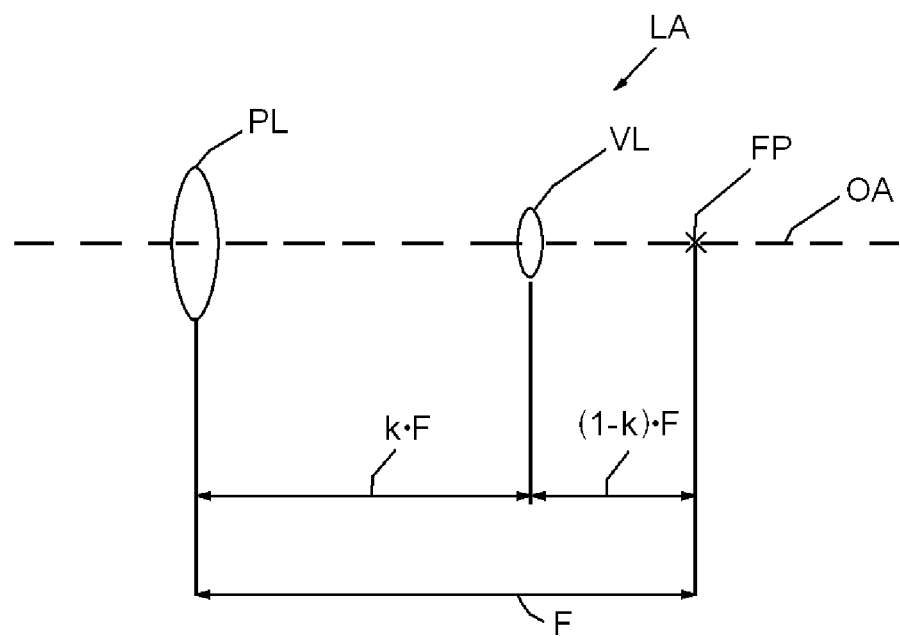
FIG. 8 is a diagram of the relationship between the positive lens assembly, variable lens assembly and positive lens focal point according to embodiments herein.

More generally, the variable lens assembly (e.g. liquid lens assembly) is located adjacent to, but remote from, a focal point of the positive lens assembly, which can be the front, or more typically, the back/rear focal point of the positive lens assembly. It is understood that the positioning adjacent to the focal point allows for the variable lens to contribute to the total power of the lens system. The distance between the variable lens assembly and the focal point can be between approximately 0.1 and 0.5 times a focal length F of the positive lens assembly. By way of illustration, reference is made to the diagram of FIG. 8, where a positive lens assembly PL is positioned along the optical axis OA with a variable lens VL adjacent to the positive lens focal point FP. The focal length F between the positive lens PL and focal point FP is depicted. The distance (1−k)*F is characterized as the distance between the variable lens VL and the focal lens and the focal point FP with k=0.9 to 0.5 (i.e. 0.9*F to 0.5*F). Thus, the distance between the positive lens PL and the variable lens VL is k*F (i.e. 0.1*F to 0.5*F). In this manner, the positive lens assembly PL and the variable lens VL assembly are part of an overall lens assembly LA focusing light on the image sensor, and the optical power of the positive lens assembly "predominantly defines" an overall optical power of the overall lens assembly—in other words, the majority of magnification/optical power is provided by the positive lens assembly, thereby minimizing the effect of drift in the variable lens assembly.

Figure 9:
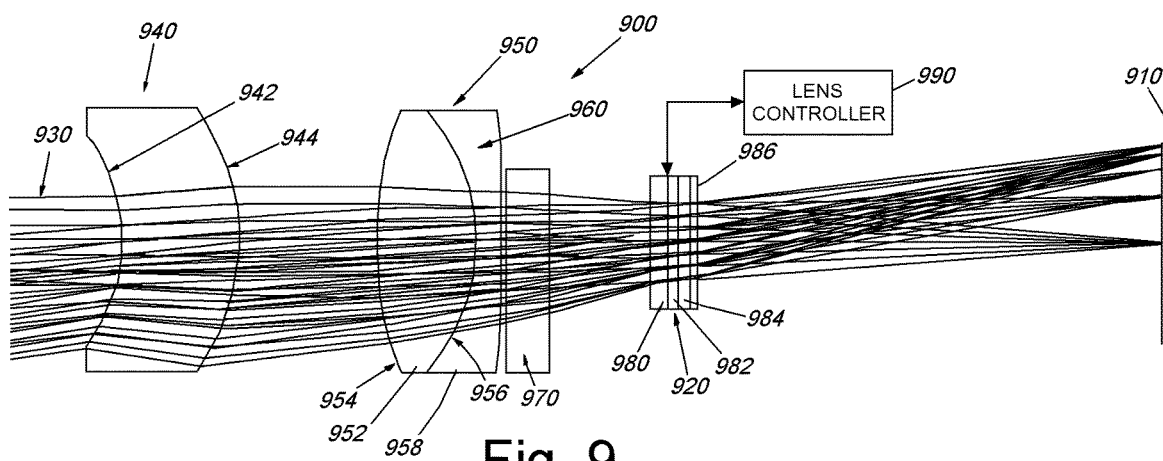
FIG. 9 is a diagram of an arrangement of lenses for a drift-tolerant lens system in which a variable lens assembly is located between the optics and the image sensor according to an embodiment.
Figure 10:
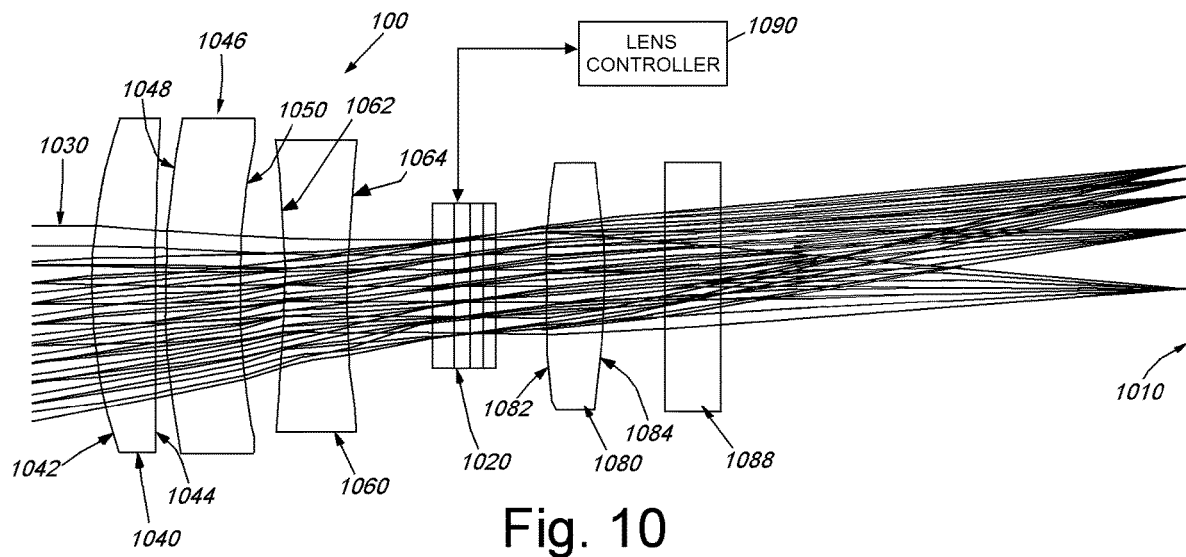
FIG. 10 is a diagram of an arrangement of lenses for a drift-tolerant lens system in which a variable lens assembly is located between two groups of optics, placed ahead of an image sensor according to an embodiment.

Reference is now made to FIGS. 9 and 10, which show two embodiments of drift-reducing lens arrangements according to embodiments. The tables hereinbelow also provide, respectively, exemplary parameters for each lens element. FIG. 9 is an arrangement 900 of lenses in association with an image sensor 910 of (e.g.) conventional design. In this embodiment, variable lens comprises a liquid lens assembly 920. The depicted rays 930 are shown reflected into the lens arrangement 900 from an object (not shown) that can be placed at a distance of (e.g.) 200 millimeters from the first lens 940. By way of non-limiting example, this lens 940 comprises a front concave surface 942 and a rear convex surface 944. This lens can comprise a polymer, such as polycarbonate (or another optically suitable material). A central lens assembly includes a front composite lens 950 with a convex lens 952 having a front surface 954 and a rear surface 956. This mates with a concave lens 958 with convex surface of similar radius and a rear convex surface 960. Note that the lens element(s) (950) can also be constructed from polycarbonate (or another optical material). A disk-shaped optical element 970 (e.g. an IR filter) with infinite radii on each side (e.g. parallel planes) is located behind the composite lens assembly 950. The rays 930 converge from the disk 970 at the variable (liquid) lens assembly 920. This exemplary assembly can be based around the Arctic 416 lens from Varioptic of France, or another appropriate (e.g.) liquid lens. It comprises a front cover disk 980, lens element 982, interconnected with the lens control circuitry 990, aperture stop (with associated radius of 341.763 millimeters) 984 and rear cover disk 986. The lens control circuitry can be operatively connected with the vision system described above. This element is adjusted to maintain focus on the image sensor 910 and resists drift based on a variety of conditions described above. The spacing between the liquid lens assembly 920 and imager can be approximately 13-14 millimeters and the spacing between the disk 970 and liquid lens assembly 920 can be approximately 3-4 millimeters. Note that the size and shape of the exemplary lenses can be modified in accordance with skill in the art, as well as the spacing therebetween. Likewise, the variable lens assembly can comprise a variety of different types, operating on differing physical principles. For example a membrane-type liquid lens available from Optotune of Switzerland can be substituted, as well as mechanical lens types.

Referring now to FIG. 10, another embodiment of a lens arrangement 1000 capable of low-drift over a given working range, is depicted. This arrangement includes an image sensor 1010 of conventional design and a variable (liquid) lens assembly 1020. Rays 1030 reflect from an object (not shown) at a range of (e.g.) 80-100 millimeters to a front convex lens 1040. By way of non-limiting example, the front lens 1040 includes a front convex surface 1042 and a rear concave surface 1044. The next lens 1046 defines a front convex surface 1048 and a rear concave surface 1050. The next lens 1060 is concave on both surfaces 1062 and 1064, with a front surface 1062 and a rear surface 1064. Rays 1030 exit this lens 1060 and are directed into the variable (e.g. liquid) lens assembly 1020, which, in this embodiment, is in the middle of the optical arrangement, with additional lenses 1080 and 1088 positioned between it and the image sensor 1010. In this example, the liquid lens assembly 1020 is similar in model and construction to the assembly 920 described above (with an aperture stop having a radius of 10.101 millimeters), and is controlled by a lens controller 1090 that can operate similarly to the controller 990 also described above. Alternate embodiments of the variable lens assembly can be employed where appropriate, as described with reference to the arrangement 900 above. Rays 1030 from the variable (e.g. liquid) lens assembly 1020 are directed into a convex lens 1080 spaced at approximately 1.2 millimeters from the liquid lens assembly. The convex lens 1080 includes a front convex surface 1082 and a rear convex surface 1084. A disk-shaped (e.g.) IR filter 1088 can be located behind the convex lens 1080. It is spaced approximately 10-12 millimeters in front of the image sensor in this embodiment. The lenses are, by way of non-limiting example, constructed from optical glass in this embodiment, but one or more of the lenses (or other optical elements) can be constructed from another acceptable material, such as polycarbonate, or an appropriate equivalent material.

The lens arrangements 900 and 1000 described above can be adapted to be enclosed in a lens package with (e.g. a conventional camera base mount, such as a C-mount, as described above). Appropriate electrical connectors can be provided between the lens body and the camera base to enable control of the variable lens assembly. The electronics of the control circuit can reside in whole or in part with respect to the lens body, or within the camera body as appropriate.

By way of non-limiting example, the lenses of the various embodiments herein can define the specified parameters in each of the tables presented below. The parameters for the lens assembly 900 (FIG. 9) are provided in the first table hereinbelow, with the associated front and rear surfaces (as applicable) of each structure or element in the overall assembly ordered (left-to-right) respectively from 0-13:

| Surface | Structure | Ref. # | Radius (mm) | Thickness or Distance to Next Surface (mm) | Material | Semi-diameter (mm) |
|---|---|---|---|---|---|---|
| 0 | Object (not shown) | | | 200.414 | | |
| 1 | lens 940 | 942 | −5.758 | 3.543 | Polycarbonate | 3.28 |
| 2 | | 944 | −6.977 | 4.121 | | 4.00 |
| 3 | lens 950 | 954 | 11.027 | 3.012 | 480R + PC | 4.00 |
| 4 | | 956 | −5.976 | 0.792 | | 4.00 |
| 5 | | 960 | −48.925 | 0.100 | | 4.00 |
| 6 | filter 970 | | infinty (flat) | 1.300 | B270 | 4.00 |
| 7 | | | infinity (flat) | 3.000 | | 4.00 |
| 8 | liquid lens 920 | | infinity (flat) | 0.550 | multiple | 2.00 |
| 9 | | | infinity (flat) | | | 2.00 |
| 10 | | | variable | | | 1.15 |
| 11 | | | infinity (flat) | 0.300 | | 2.00 |
| 12 | | | infinity (flat) | 13.884 | | 2.00 |
| 13 | Image 910 | | | | | |

The table below is for the lens assembly 1000 (FIG. 10), with the associated front and rear surfaces (as applicable) of each structure or element in the overall assembly ordered (left-to-right) respectively from 0-14:

| Surface | Structure | Ref. # | Radius (mm) | Thickness or Distance to Next Surface (mm) | Material | Semi-diameter (mm) |
|---|---|---|---|---|---|---|
| 0 | Object (not shown) | | | 82.081 | | |
| 1 | lens 1040 | 1042 | 13.078 | 1.461 | N-LASF9 | 4.00 |
| 2 | | 1044 | 49.620 | 0.256 | | 4.00 |
| 3 | lens 1046 | 1048 | 19.922 | 1.770 | N-SF6 | 4.00 |
| 4 | | 1050 | 18.444 | 1.066 | | 4.00 |
| 5 | lens 1060 | 1062 | −25.000 | 1.495 | N-SF6 | 4.00 |
| 6 | | 1064 | 25.000 | 2.000 | | 4.00 |
| 7 | liquid lens 1020 | | infinity (flat) | 0.550 | multiple | 2.00 |
| 8 | | | infinity (flat) | | | 2.00 |
| 9 | | | variable | | | 1.15 |
| 10 | | | infinity (flat) | 0.300 | | 2.00 |
| 11 | | | infinity (flat) | 1.200 | | 2.00 |
| 12 | lens 1080 | 1082 | 23.854 | 1.400 | N-LASF9 | 3.00 |
| 13 | | 1084 | −18.000 | 1.433 | | 3.00 |
| 14 | filter 1088 | | infinity (flat) | 1.300 | B270 | 3.00 |
| 15 | | | infinity (flat) | 11.100 | | 3.00 |
| 16 | Image | 1010 | | | | |

It is further contemplated that the drift-compensating lens arrangement of the embodiments herein can be employed in combination with other drift-reducing methods, such as temperature stabilization of the variable lens or optical feedback systems. By way of non-limiting example, and incorporated herein by reference as useful background information, such arrangements are shown and described in commonly assigned U.S. Pat. No. 8,576,390, entitled SYSTEM AND METHOD FOR DETERMINING AND CONTROLLING FOCAL DISTANCE IN A VISION SYSTEM CAMERA, by Nunnink. Reference is also made to U.S. patent application Ser. No. 14/139,867, entitled CONSTANT MAGNIFICATION LENS FOR VISION SYSTEM CAMERA, by Nunnink; U.S. patent application Ser. No. 13/800,055, entitled LENS ASSEMBLY WITH INTEGRATED FEEDBACK LOOP FOR FOCUS ADJUSTMENT, by Nunnink et al. Illustratively, this application provides a removably mountable lens assembly for a vision system camera that includes an integral auto-focusing, liquid lens unit, in which the lens unit compensates for focus variations by employing a feedback control circuit that is integrated into the body of the lens assembly. The feedback control circuit receives motion information related to and actuator, such as a bobbin (which variably biases the membrane under current control) of the lens from a position sensor (e.g., a Hall sensor) and uses this information internally to correct for motion variations that deviate from the lens setting position at a target lens focal distance setting. The position sensor can be a single unit, or a combination of discrete sensors located variously with respect to the actuator/bobbin to measure movement at various locations around the lens unit. Illustratively, the feedback circuit can be interconnected with one or more temperature sensors that adjust the lens setting position for a particular temperature value. In addition, the feedback circuit can communicate with an accelerometer that senses the acting direction of gravity, and thereby corrects for potential sag (or other orientation-induced deformation) in the lens membrane based upon the spatial orientation of the lens.

III. Drift-Reduction Lens Assembly

Figure 11:
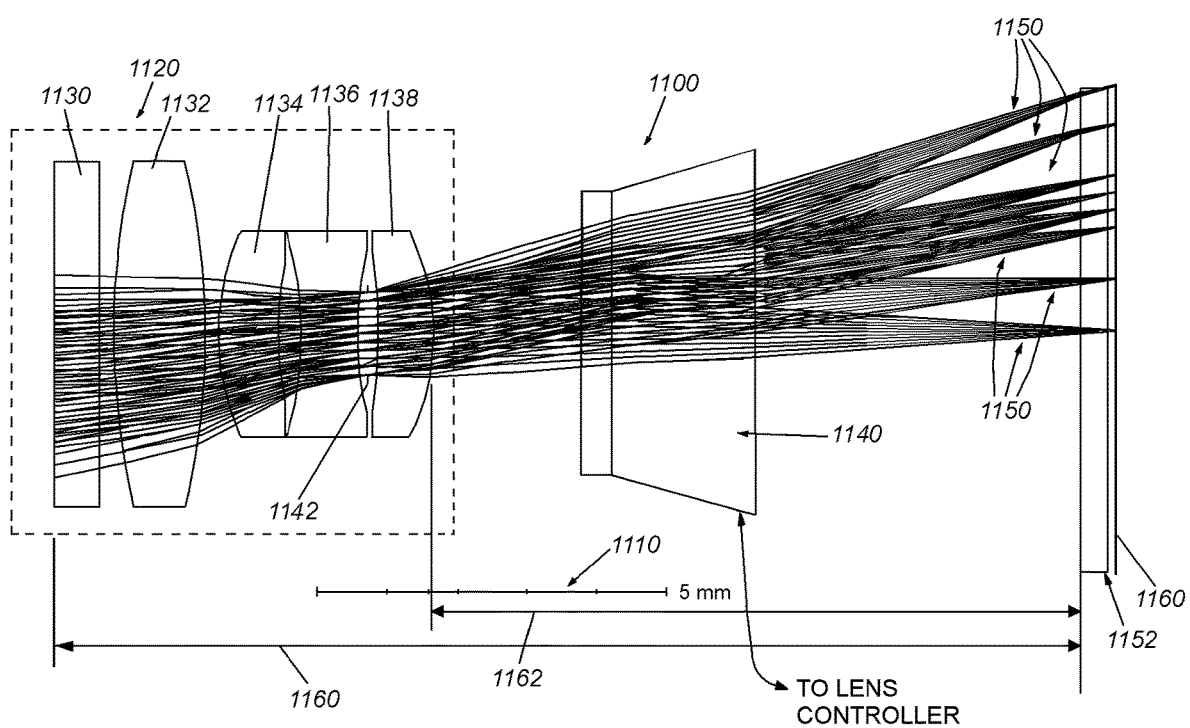
FIG. 11 is a diagram of an arrangement of lenses for a 12-millimeter, drift-tolerant lens system in which a variable lens assembly is located between the optics and the image sensor according to another embodiment.

FIGS. 11-18 variously describe embodiments of a drift-reduction lens allowing for extended range reading of object features (e.g. ID codes) for use in a variety of camera assemblies and associated applications, including handheld and fixed-mount units. Focal ranges of up to approximately 8 meters can be imaged using the lens arrangements herein. In general, the illustrative arrangements provide a variable-focus (e.g. liquid) lens positioned behind the remaining, fixed lens optics package—such that the variable lens is generally at the rear of the lens assembly, and between the fixed optics package and camera image sensor. With reference to FIG. 11, a lens arrangement 1100 is shown. This arrangement is applicable to a 12-millimeter (f'=12) lens. As shown, the relative scale 1110 of the overall lens arrangement (in millimeters) is provided. The lens' fixed optics (shown in dashed box 1120) consists of a front plate element 1130, followed by a biconvex lens 1132. A set of three, smaller diameter lenses 1134 (positive), 1136 (biconcave) and 1138 (positive—opposite facing) are provided behind the biconvex lens 1132. In this embodiment, the fixed optics package 1120 is provided in a separate lens housing, while a variable-focus lens assembly 1140 is mounted within the framework of the vision system housing (e.g. a handheld ID reader, such as described in commonly assigned U.S. patent application Ser. No. 14/550,709, entitled IMAGE MODULE INCLUDING MOUNTING AND DECODER FOR MOBILE DEVICES, filed Nov. 21, 2014). By way of non-limiting example, the variable lens assembly 1140 can comprise the above-described liquid lens mechanism, available from Optotune of Switzerland. The variable lens assembly can alternatively comprise any acceptable, manually or electronically adjustable lens arrangement, including those described above, available from Varioptic of France. The variable lens assembly 1140 can be interconnected (via a cable, printed circuit traces, etc.) to the vision system processor or another controller that allows the focal length of the lens to be adjusted. This controller can be integrated with the above-described feedback system. The variable lens assembly 1140 is optionally arranged with one or more filters and/or dust covers as appropriate. An aperture stop 1142 is also provided in this embodiment. The variable lens assembly 1140 focuses light (rays 1150) onto the image sensor 1152 for transmission to the vision system processor. The overall length 1160 of arrangement 1100 between the front surface of the plate 1130 and image sensor 1152 is approximately 15.2 millimeters. The distance 1162 between the rear face of the rear lens 1138 and the image plane (image sensor 1152) is approximately 10.26 millimeters. By way of example, the approximate parameters of the arrangement 1100 define F/# of 7; an image radius of 3 millimeters (i.e. ⅓ inch at 1.2-Megapixel sensor, up to a 5.0-Megapixel sensor); an RMS spot radius of 1.7 μm for 3 mm image height; and a measured distortion of less than 3%-4%.

The table below is for the lens assembly 1100 (FIG. 11), with the associated front and rear surfaces (as applicable) of each structure or element in the overall assembly ordered (left-to-right) respectively from 0-16:

| Surface | Structure | Radius (mm) | Thickness or distance to next surface (mm) | Material | Semi-diameter (mm) |
|---|---|---|---|---|---|
| 0 | Object (not shown) | | 500 | | |
| 1 | filter 1130 | infinity (flat) | 0.650 | B-270 | 2.50 |
| 2 | | infinity (flat) | 0.200 | | 2.50 |
| 3 | lens 1132 | 11.175 | 1.300 | N-SK16 | 2.50 |
| 4 | | −11.175 | 0.200 | | 2.50 |
| 5 | lens 1134 | 3.765 | 0.850 | N-SK16 | 1.50 |
| 6 | | 5.228 | 0.336 | | 1.00 |
| 7 | lens 1136 | −5.227 | 0.800 | N-SF2 | 1.50 |
| 8 | | 5.227 | 0.150 | | 1.20 |
| 9 | aperture stop 1142 | | 0.150 | multiple | 0.63 |
| 10 | lens 1138 | −8.538 | 0.800 | N-BAF10 | 1.20 |
| 11 | | −3.331 | 1.100 | | 1.50 |
| 12 | liquid lens 1100 | variable | | multiple | 1.60 |
| 13 | | infinity (flat) | | | 1.60 |
| 14 | sensor window 1152 | infinity (flat) | 0.400 | D263T | |
| 15 | | infinity (flat) | 0.125 | | |
| 16 | Image 1160 | | | | |

Note that the various tables of lens parameters presented above and further below are only by way of example of a wide range of possible implementations. It should be clear to those of skill that any or all of the lenses and/or optical components herein can be altered by employing different parts, sizes, focal lengths, thicknesses, etc. as appropriate to the mechanical and optical needs of the imaging application.

Figure 12:
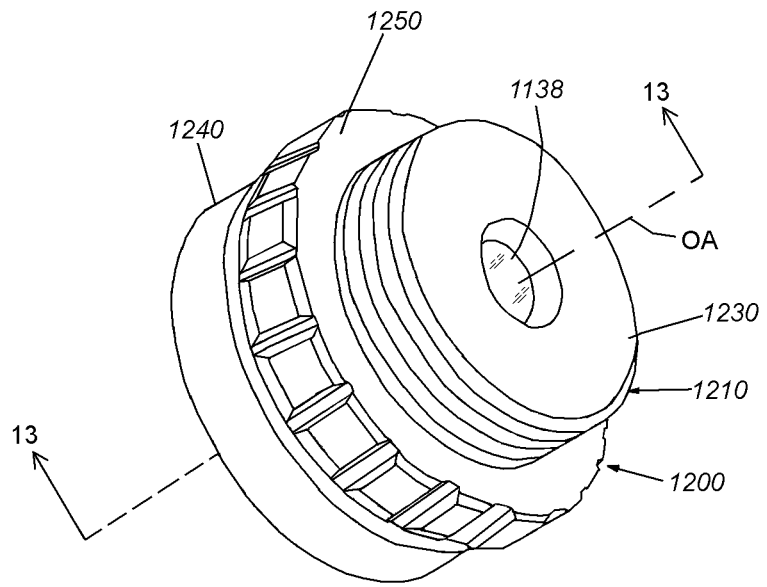
FIG. 12 is a perspective view of a lens assembly that includes the lens arrangement of FIG. 11.
Figure 13:
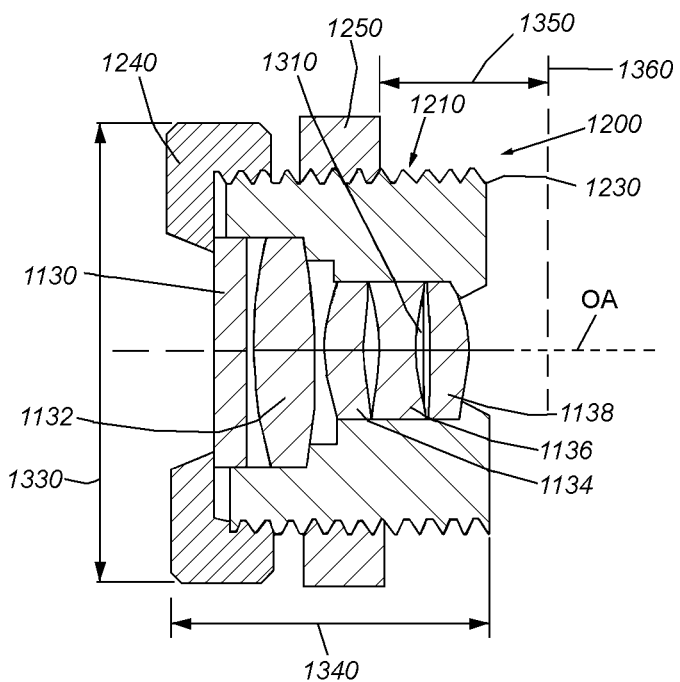
FIG. 13 is a side cross section of the lens taken along line 13-13 of FIG. 12.

FIGS. 12 and 13 show a lens assembly 1200 corresponding to the fixed optics package 1120. The lens elements are contained within a barrel housing 1210 constructed from aluminum, or another acceptable material. The lens elements are similarly numbered to their counterparts in the assembly 1120 of FIG. 11. The base 1230 of the lens 1200 can be any acceptable format—for example, a C-mount threaded base (i.e. 1 inch×32 threads-per-inch) can be specified for the full length of the barrel. Alternatively, an M8×0.5 thread can be specified for the full length of the barrel, or in either case, an appropriate portion thereof. As shown in the cross section of FIG. 13, an aperture stop 1310 can be located between the biconcave lens 1136 and rearmost positive lens 1138. The lenses 1130-1138 contained within the barrel 1210 are retained by a front retaining ring 1240 with an outside diameter 1330 of 10 millimeters, which is threaded onto the front end of the barrel 1210. A threaded spacer ring 1250 is also threaded onto the barrel, and is located therealong so as to set the focal distance of the lens assembly with respect to the image plane. In an embodiment, when the ring 1250 is properly located on the lens barrel 1210, it can be permanently/semi-permanently secured to the barrel using thread-locking compound, adhesive or another fixing mechanism (e.g. a set screw, pin, etc.). When the lens is threaded into the device's lens mount, the ring 1250 bears against the mounting and provides a desired spacing. In an embodiment, the overall lens length 1340 is approximately 6.9 millimeters, and the set distance 1350 between the rear face of the retaining ring 1250 and the image plane 1360 is approximately 12.15 millimeters.

FIGS. 14-18 variously depict versions of a drift-reduction lens assembly that can include the variable lens within its overall structure and that can be employed in (e.g.) fixed mount vision systems—for example, ID readers used in logistics and object tracking applications.

Figure 14:
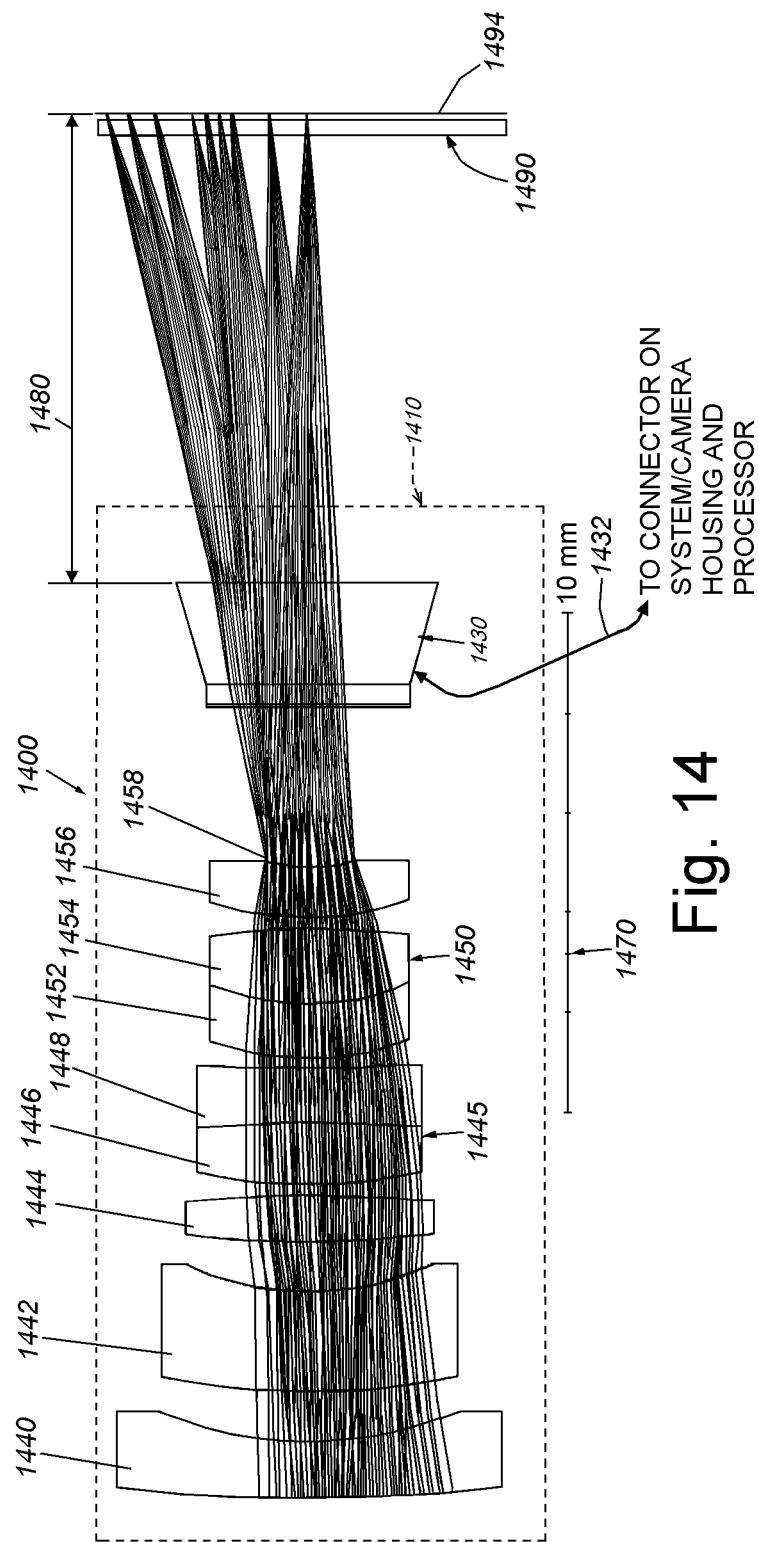
FIG. 14 is a diagram of an arrangement of lenses for a 16-millimeter, drift-tolerant lens system in which a variable lens assembly is located between the optics and the image sensor according to another embodiment.

With reference to FIG. 14, a 16-millimeter lens arrangement 1400 is shown. This arrangement can be constructed with a housing 1410 that includes the variable (e.g. liquid) lens assembly 1430 within the overall package. The lens assembly is connected via a cable 1432 or other modality to a connector/contacts on the camera, or other vision system housing, which communicates with the processor so that the focal distance of the lens assembly 1430 can be controlled. Note that a variety of circuitry can be built into/onto the lens housing to perform some or all of the variable-lens-control functions.

Figure 14A:
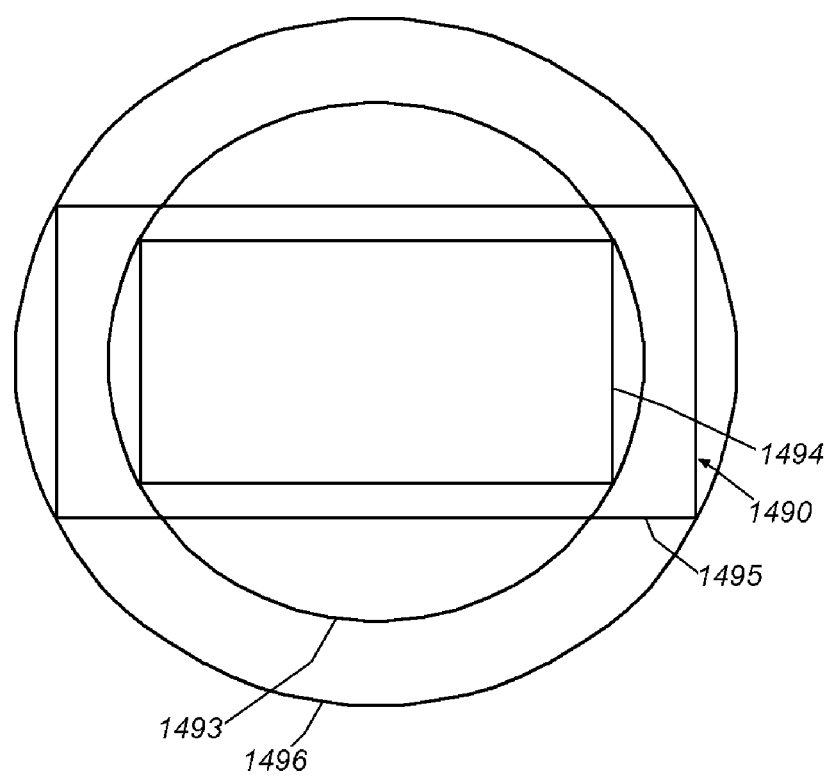
FIG. 14A is a diagram of the image circles a rectangular image sensor that can be employed in the vision system according to an embodiment.

The lens arrangement 1400 includes a front negative lens 1440, followed by a smaller-diameter negative lens 1442, another biconvex lens 1444, and a smaller-diameter doublet 1445 consisting of a biconvex lens 1446 and planoconcave lens 1448. A second, smaller diameter doublet 1450, consisting of a positive lens 1452 and biconvex lens 1454, is provided behind the first doublet 1445, and a positive lens 1456 is provided between the doublet 1450 and variable (liquid) lens assembly 1430. An aperture stop 1458 can also be provided at the rear surface of the last positive lens 1456. The relative scale 1470, in millimeters, is depicted and the back focal length 1480 between the rear of the variable lens 1430 and the image plane on the surface of the image sensor 1490 is set at approximately 8.5 millimeters—using (e.g.) appropriate adjustment rings, bases, mounts, etc. that should be clear to those of skill. As shown briefly in FIG. 14A, this generates an image circle of approximately 8 millimeters in diameter. This lies within the maximum image circle 1496 (approximately 8.83 millimeters) of the depicted, exemplary sensor 1490 is an IMX265 model image CMOS sensor (by Sony Corporation of Japan). That is, the image circle 1496 circumscribes the corners of the rectangular perimeter 1495, which represents the usable array of image pixels for the sensor 1490. Other image sensors, such as that having a pixel array defined by the rectangle 1494, are characterized by a different (in this example, smaller—e.g. 7.66 millimeters) image circle dimension (1493). Such a smaller-dimension sensor is available from Teledyne e2v, Ltd. (UK).

Other exemplary optical parameters of the lens assembly 1400 can include a focal length of approximately 16.2 to 16.6 millimeters, aperture size of F8, a total track of approximately 27.9 millimeters, a focus range of 1.0-4.0 meters and a working range for the variable lens of between approximately 0.0 and 2.5 diopters. Within this range, there is theoretically 2.5-times less drift than a conventional design. The RMS spot radius is below 2.2 microns in the extreme field of view (FOV) position.

The table below is for the lens assembly 1400 (FIG. 14), with the associated front and rear surfaces (as applicable) of each structure or element in the overall assembly ordered (left-to-right) respectively from 0-20:

| Surface | Structure | Radius (mm) | Thickness or Distance to Next Surface (mm) | Material | Semi-diameter (mm) |
|---|---|---|---|---|---|
| 0 | Object (not shown) | | 1828.571 | | |
| 1 | lens 1440 | 25.720 | 1.143 | N-BK7 | 3.886 |
| 2 | | 6.657 | 1.000 | | 3.000 |
| 3 | lens 1442 | 14.130 | 2.000 | N-SK16 | 3.000 |
| 4 | | 5.789 | 1.000 | | 2.500 |
| 5 | lens 1444 | 20.400 | 0.914 | N-SK16 | 2.500 |
| 6 | | −32.069 | 0.229 | | 2.266 |
| 7 | doublet 1445 | 10.082 | 1.234 | N-SK16 + | 2.237 |
| 8 | | −32.093 | 1.097 | N-SF2 | 2.129 |
| 9 | | 32.093 | 0.200 | | 1.988 |
| 10 | doublet 1450 | 5.850 | 1.097 | N-SF2 + N-BK7 | 2.000 |
| 11 | | 5.000 | 1.500 | | 2.000 |
| 12 | | −12.411 | 0.229 | | 2.000 |
| 13 | lens 1456 | 6.259 | 1.000 | N-SF2 | 2.000 |
| 14 | | 3.130 | 0.229 | | 0.920 |
| 15 | aperture stop 1458 | | 1.000 | multiple | 0.898 |
| 16 | liquid lens | variable | | multiple | 1.600 |
| 17 | 1430 | infinity (flat) | 9.740 | | 1.600 |
| 18 | sensor window 1490 | infinity (flat) | 0.400 | D263T | |
| 19 | | infinity (flat) | 0.125 | | |
| 20 | Image 1494 | | | | |

Figure 15:
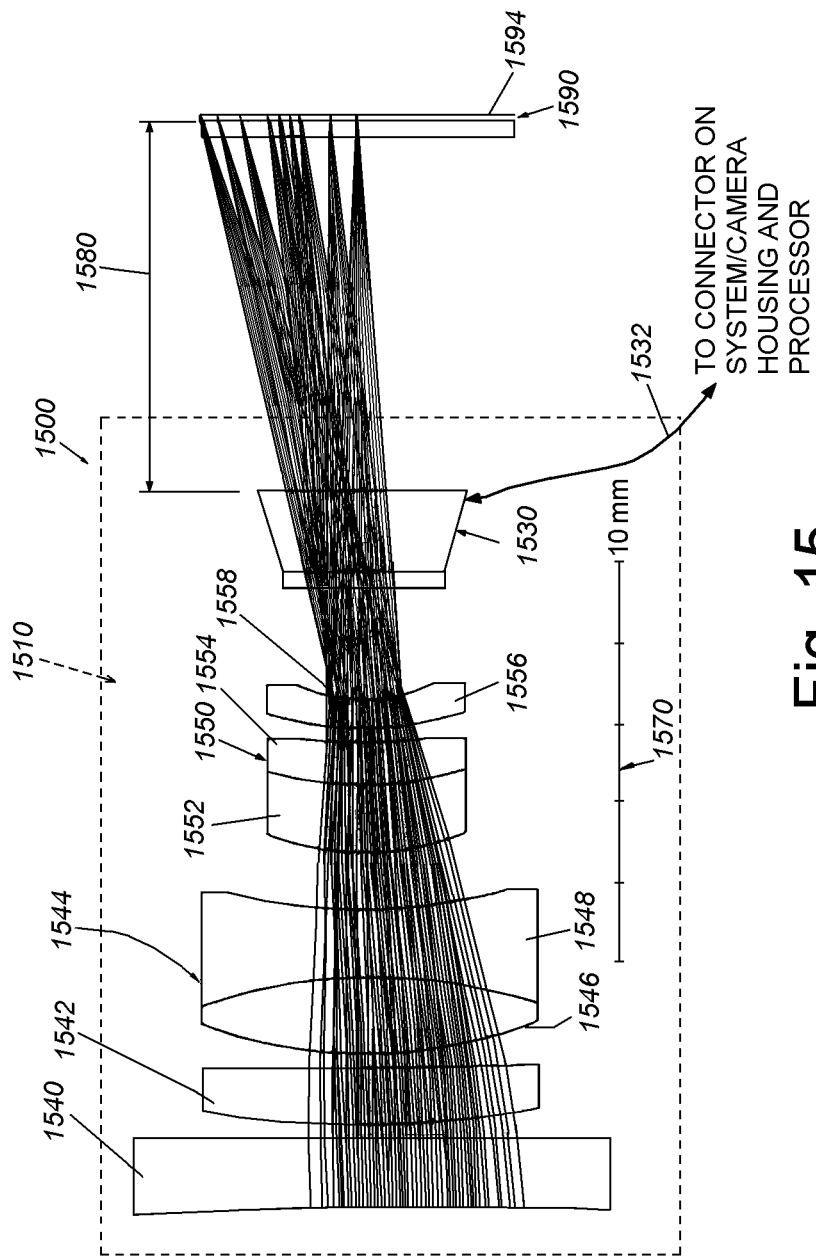
FIG. 15 is a diagram of an arrangement of lenses for a 25-millimeter, drift-tolerant lens system in which a variable lens assembly is located between the optics and the image sensor according to another embodiment.

With reference to FIG. 15, a 25-millimeter lens arrangement 1500 is shown. This arrangement can be constructed with a housing 1510 that includes the variable (e.g. liquid) lens assembly 1530 within the overall package. The lens assembly is connected via a cable 1532 or other modality to a connector/contacts as described above. The lens arrangement 1500 includes a front lens 1540 with a slightly concave front face, followed by a smaller-diameter planoconvex lens 1542, and a doublet 1544 consisting of a biconvex lens 1546 and biconcave lens 1548. A second, smaller-diameter doublet 1550, consisting of a first positive lens 1552 and second lens 1554, is provided behind the first doublet 1544, and a negative lens 1556 is provided between the doublet 1550 and variable (liquid) lens assembly 1530. An aperture stop 1558 can also be provided at the rear surface of the last positive lens 1556. The relative scale 1570, in millimeters, is depicted and the back focal length 1580 between the rear of the variable lens 1530 and the image plane on the surface of the image sensor 1590 (e.g. approximately an 8-millimeter image circle) is set at approximately 8.5 millimeters— using (e.g.) appropriate adjustment rings, bases, mounts, etc. that should be clear to those of skill. Other parameters of the lens assembly include a focal length of approximately 24.2 to 25.2 millimeters, aperture size of F8, a total track of approximately 27.6 millimeters, a focus range of 1.0-4.0 meters and a working range for the variable lens of between approximately 0.0 and 4.0 diopters. Within this range, there is theoretically four-times less drift than a conventional design. The RMS spot radius is below 1.9 microns in the extreme field of view (FOV) position.

The table below is for the lens assembly 1500 (FIG. 11), with the associated front and rear surfaces (as applicable) of each structure or element in the overall assembly ordered (left-to-right) respectively from 0-16:

| Surface | Structure | Radius (mm) | Thickness or Distance to Next Surface (mm) | Material | Semi-diameter (mm) |
|---|---|---|---|---|---|
| 0 | Object (not shown) | | variable | | |
| 1 | lens 1540 | 141.523 | 1.786 | N-SK16 | 6.071 |
| 2 | | infinity (flat) | 0.300 | | 6.071 |
| 3 | lens 1542 | 24.589 | 1.429 | N-SK16 | 4.286 |
| 4 | | 179.888 | 0.357 | | 4.286 |
| 7 | doublet 1544 | 11.789 | 1.929 | N-SK16 + | 4.286 |
| 8 | | −13.653 | 1.714 | N-SF2 | 4.286 |
| 9 | | 13.653 | 1.434 | | 3.571 |
| 10 | doublet 1550 | 6.888 | 1.714 | N-SF2 + N-BK7 | 2.500 |
| 11 | | 8.747 | 1.071 | | 2.500 |
| 12 | | 14.691 | 0.357 | | 1.786 |
| 13 | lens 1556 | 8.245 | 0.714 | N-BK7 | 2.500 |
| 14 | | 4.122 | 0.357 | | 1.786 |
| 15 | aperture stop 1558 | | 1.429 | multiple | 0.850 |
| 16 | liquid lens | variable | | multiple | 1.600 |
| 17 | 1530 | infinity (flat) | 8.500 | | 1.600 |
| 14 | sensor window 1590 | infinity (flat) | 0.400 | D263T | |
| 15 | | infinity (flat) | 0.125 | | |
| 16 | Image 1594 | | | | |

Figure 16:
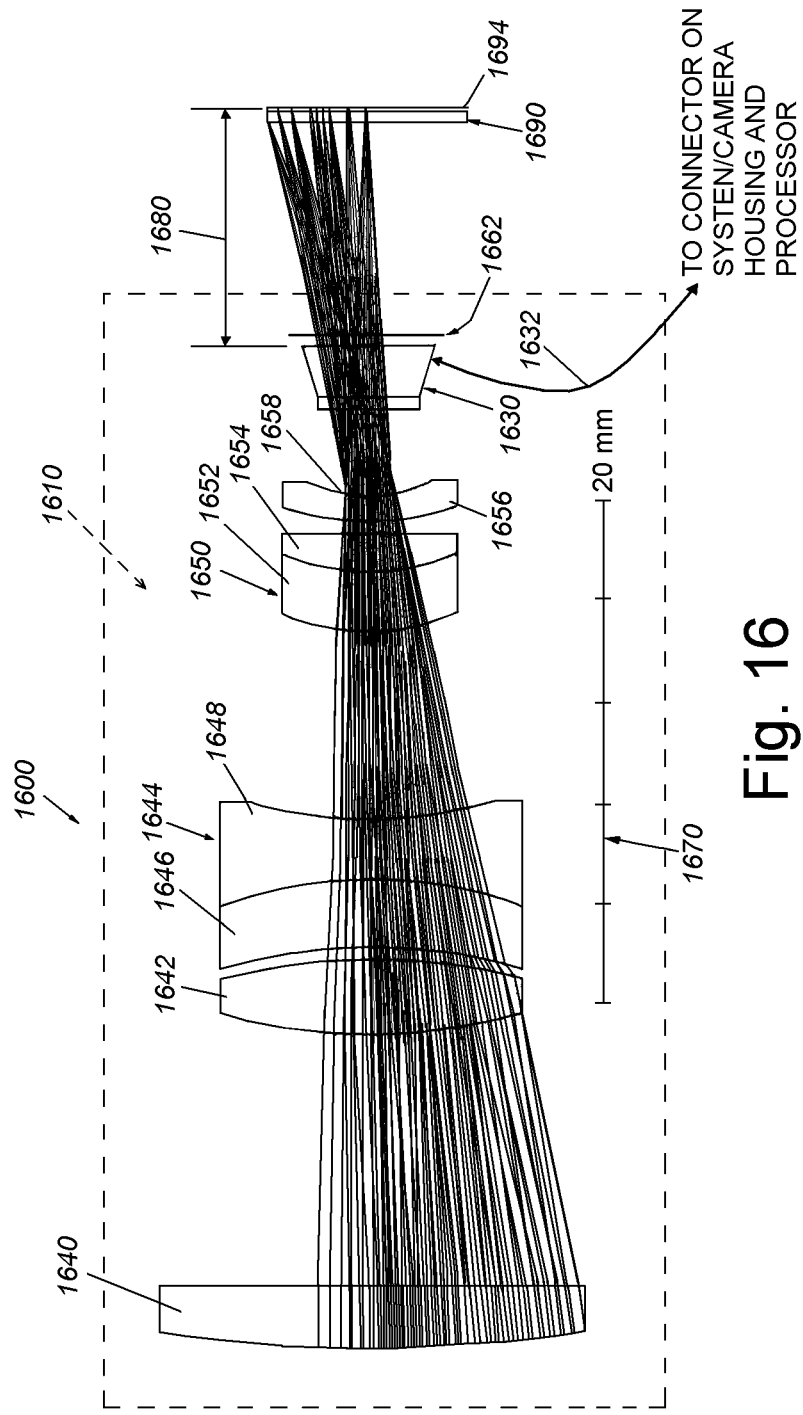
FIG. 16 is a diagram of an arrangement of lenses for a 35-millimeter, drift-tolerant lens system in which a variable lens assembly is located between the optics and the image sensor according to another embodiment.

With reference to FIG. 16, a 35-millimeter lens arrangement 1600 is shown. The lens arrangement in this embodiment is adapted for use in large-scale camera assemblies, such as those employed in high-volume logistics operations (e.g. fulfillment services, mass shipping, etc.) involving various-size objects. This lens arrangement 1600 can be constructed with a housing 1610 (shown in FIG. 16 as a dashed box, and described in further detail below), which includes the variable (e.g. liquid) lens assembly 1630 within the overall package. The lens assembly is connected via a cable 1632 or other modality to a connector/contacts as described above.

The lens arrangement 1600 includes a front large-diameter planoconvex lens 1640, followed by a smaller-diameter biconvex lens 1642, stacked with a doublet 1644 consisting of a positive lens 1646 and biconcave lens 1648. A second, smaller-diameter doublet 1650, consisting of a first positive lens 1652 and second planoconvex lens 1654, is provided behind the first doublet 1644, and a negative lens 1656 is provided between the doublet 1650 and variable (liquid) lens assembly 1630. An aperture stop 1658 can also be provided on the rear surface of the last negative lens 1656. The relative scale 1670, in millimeters, is depicted and the back focal length 1680 between the rear of the variable lens 1630 and the image plane on the surface of the image sensor 1690 (e.g. an 8-millimeter image circle) is set at approximately 8.5 millimeters. Other parameters of the lens assembly include a focal length of approximately 32.4 to 34.8 millimeters, aperture size of F8, a total track of approximately 49.6 millimeters, a focus range of 1.0-4.0 meters and a working range for the variable lens of between approximately 0.0 and 6.5 diopters. Within this range, there is theoretically 6.5-times less drift than a conventional design. The RMS spot radius is below 3.4 microns in the extreme field of view (FOV) position.

The table below is for the lens assembly 1600 (FIG. 16), with the associated front and rear surfaces (as applicable) of each structure or element in the overall assembly ordered (left-to-right) respectively from 0-20:

| Surface | Structure | Radius (mm) | Thickness or Distance to Next Surface (mm) | Material | Semi-diameter (mm) |
|---|---|---|---|---|---|
| 0 | Object (not shown) | | variable | | |
| 1 | lens 1640 | 55.586 | 2.500 | N-SK16 | 8.500 |
| 2 | | infinity (flat) | 10.000 | | 8.500 |
| 3 | lens 1642 | 20.856 | 3.000 | N-SK16 | 6.000 |
| 4 | | −24.197 | 0.500 | | 6.000 |
| 7 | doublet 1644 | −20.861 | 2.700 | N-SK16 + | 6.000 |
| 8 | | 17.704 | 2.400 | N-SF2 | 6.000 |
| 9 | | 17.704 | 7.479 | | 5.000 |
| 10 | doublet 1650 | 8.787 | 2.400 | N-SF2 + | 3.500 |
| 11 | | 9.034 | 1.500 | N-BK7 | 3.500 |
| 12 | | −2195.069 | 0.500 | | 2.500 |
| 13 | lens 1656 | 11.052 | 1.000 | N-BK7 | 3.500 |
| 14 | | 5.526 | 0.500 | | 2.500 |
| 15 | aperture stop 1658 | | 2.000 | | 0.892 |
| 16 | liquid lens 1630 | variable | | multiple | 1.600 |
| 17 | | infinity (flat) | 8.500 | | 1.600 |
| 18 | sensor window 1690 | infinity (flat) | 0.400 | D263T | |
| 19 | | infinity (flat) | 0.125 | | |
| 20 | Image 1694 | | | | |

The table below is for the lens assembly 1800 (FIG. 18), with the associated front and rear surfaces (as applicable) of each structure or element in the overall assembly ordered (left-to-right) respectively from 0-22:

| Surface | Structure | Radius (mm) | Thickness or Distance to Next Surface (mm) | Material | Semi-diameter (mm) |
|---|---|---|---|---|---|
| 0 | Object (not shown) | | variable | | |
| 1 | filter 1840 | infinity (flat) | 2.000 | multiple | 10.750 |
| 2 | | infinity (flat) | 3.500 | | 10.750 |
| 3 | lens 1842 | infinity (flat) | 2.000 | N-SK16 | 9.500 |
| 4 | | −46.710 | 1.000 | | 9.500 |
| 5 | doublet 1844 | 19.310 | 2.700 | N-SK16 + | 7.500 |
| 6 | | infinity (flat) | 2.400 | N-SF2 | 7.500 |
| 7 | | 62.220 | 1.500 | | 7.000 |
| 8 | lens 1850 | −30.000 | 2.000 | N-SF2 | 7.500 |
| 9 | | 30.000 | 1.000 | | 7.000 |
| 10 | lens 1852 | 24.550 | 3.400 | N-SK16 | 7.500 |
| 11 | | 300.000 | 1.000 | | 7.000 |
| 12 | lens 1854 | −300.000 | 3.400 | N-SF2 | 7.000 |
| 13 | | −24.550 | 1.000 | | 7.500 |
| 14 | doublet 1856 | 18.000 | 2.400 | N-SF2 + | 4.000 |
| 15 | | 9.000 | 1.500 | N-SK16 | 4.000 |
| 16 | | 12.700 | 1.000 | | 3.500 |
| 17 | lens 1858 | 30.000 | 1.500 | N-SK16 | 4.000 |
| 18 | | 17.140 | 0.500 | | 3.000 |
| 19 | aperture stop 1859 | | | | 0.987 |
| 20 | liquid lens 1860 | variable | | multiple | 1.600 |
| 21 | | infinity (flat) | 9.103 | | 1.600 |
| 22 | Image (not shown) | | | | |

Figure 17:
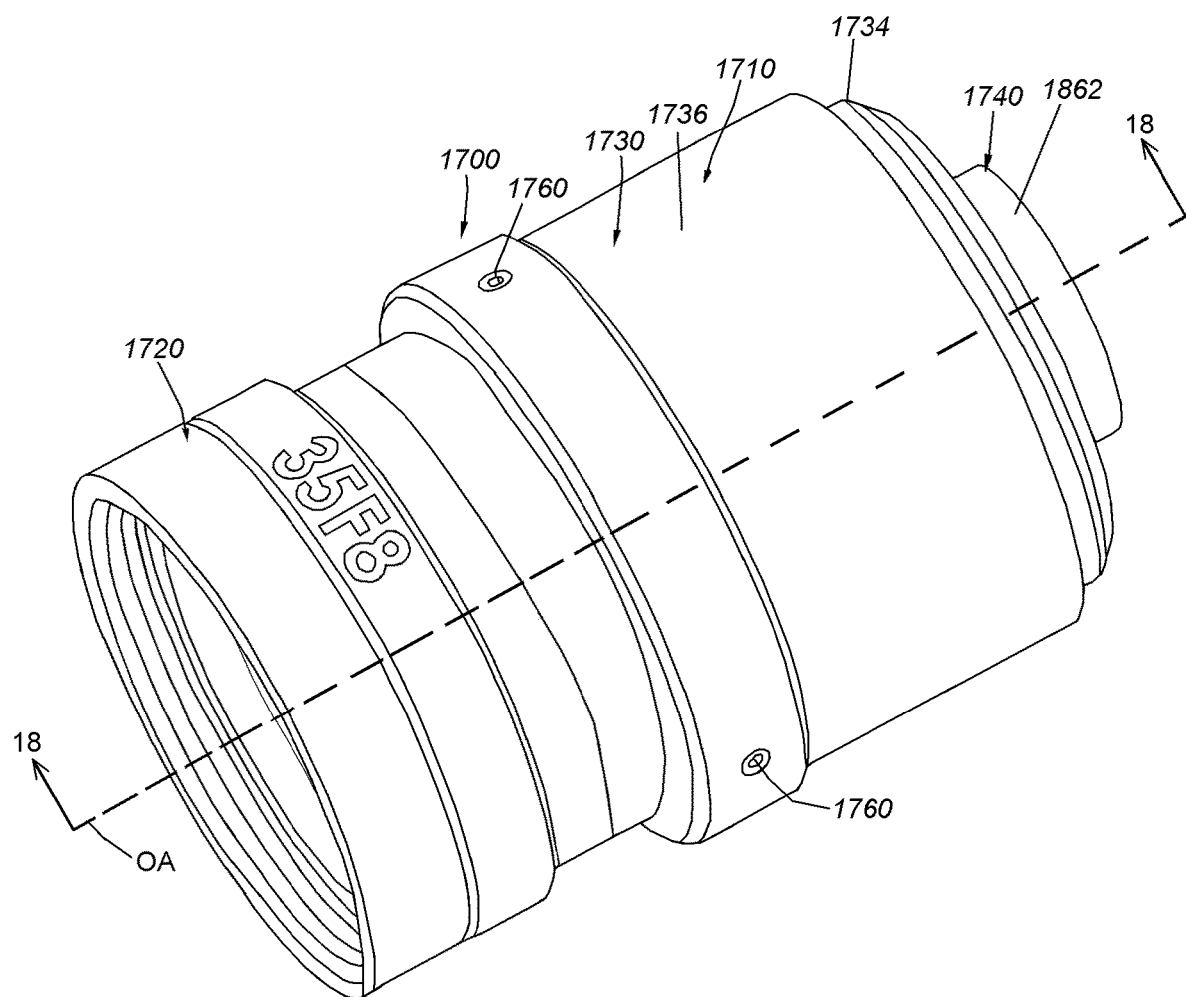
FIG. 17 is a is a perspective view of a lens assembly that includes a version of the lens arrangement of FIG. 16.
Figure 18:
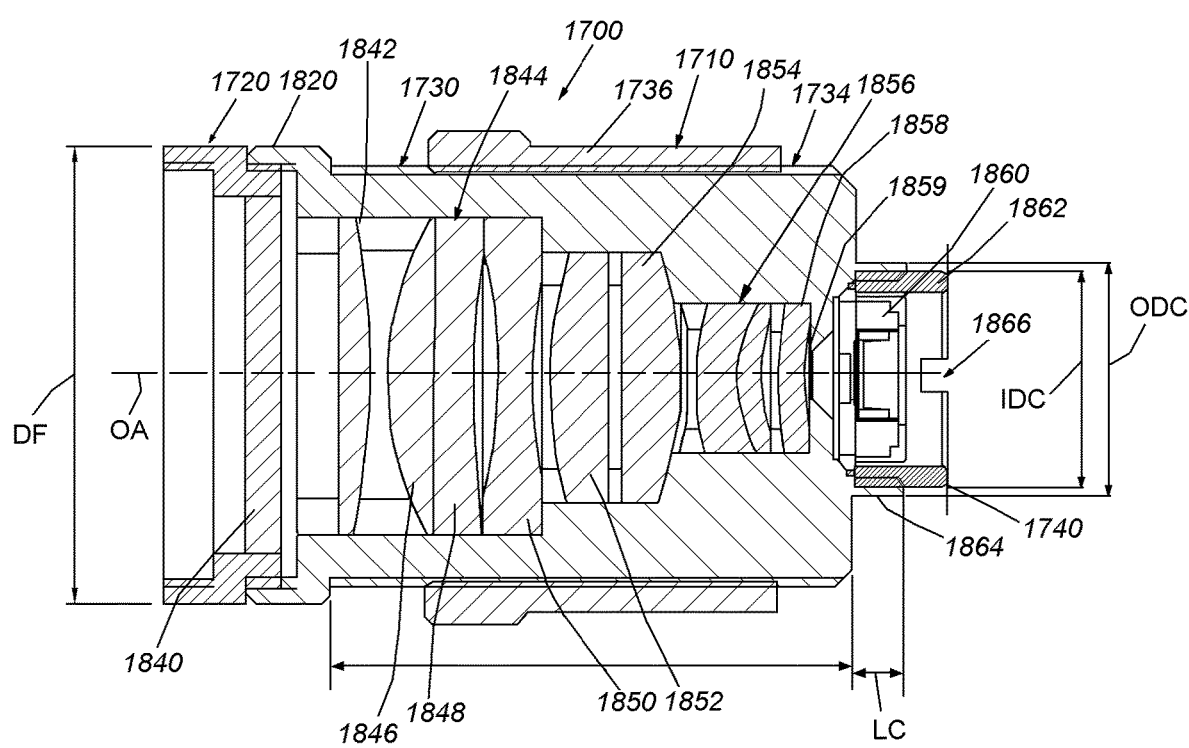
FIG. 18 is a side cross section of the lens taken along line 18-18 of FIG. 17.

As shown in FIGS. 17 and 18, a further embodiment and/or implementation of the 35-millimeter reduced-drift lens 1700 is shown in further detail. This lens assembly 1700 includes an outer housing 1710 that encloses a series of lenses that are functionally similar or identical to the above-described arrangement 1600 in FIG. 16. The housing can be constructed from any acceptable material (e.g. aluminum alloy), and in a variety of shapes. As shown, the housing 1710 includes a front end 1720, main barrel 1730 and rear end 1740. With further reference to FIG. 18, the lens front 1720 is threaded into an internal thread, which is formed in a widened flange 1820 of the main barrel 1730. Note that an optional filter (e.g. a red bandpass filter) 1840 can be fitted to the lens front in this or other embodiments. The overall diameter DF of the lens front end 1720 is approximately 27.5 millimeters. In general, the filter 1840 can be a commercially available, threaded filter of appropriate optical specifications (e.g. wavelength bandpass for visible color, IR, UV, etc.). The main barrel 1730 houses a planoconvex lens 1842 in front of a doublet 1844 consisting of a planoconvex lens 1846 and planoconcave lens 1848 that together generate a positive lens geometry. A biconcave lens 1850 is stacked behind the doublet 1844. A smaller-diameter pair of opposing planoconvex lenses 1852 and 1854 is provided behind the biconcave lens 1850. A smaller-diameter doublet 1856 defines a negative lens behind the lenses 1852 and 1854. This doublet 1856 resides behind a rearmost positive lens 1858. The variable (i.e. liquid) lens 1860 resides behind the lens 1858. It is retained in the smaller-diameter rear end 1740 by a threaded, annular retaining ring 1862 that sits inside a rear collar 1864 with (e.g.) an M13×0.5 internal thread. The inner diameter IDC of the collar is approximately 13 millimeters (threaded) and the outer diameter ODC is approximately 14 millimeters, and its axial length LC can be approximately 3.1 millimeters. The retaining ring 1862 can include a slot 1866 for in tightening by a blade-shaped tool of appropriate side and shape. Note that the lens arrangement 1700 can also include an aperture stop 1859 within the optical path at an appropriate location—for example adjacent to the liquid lens assembly 1860 on the rear surface of the lens 1858.

The barrel 1730 can be threaded at the back end 1734 to mate with an internal thread on a camera assembly lens mount. The depth of mounting is controlled by an adjustment sleeve 1736 that slides over the barrel 1730. One or more keyways (not shown) formed between the inner surface of the sleeve 1736 and outer surface of the barrel 1730 can be used to restrict rotation of the sleeve relative to the barrel, while allowing an axial sliding motion (axial being parallel to the optical axis OA. The sleeve 1736 is retained in a desired position by one or more set screws 1760. The threaded back end 1734 of the barrel can define a standard C-mount size thread in an embodiment. Hence the outer diameter of the barrel 1730 is approximately 25 millimeters. The depicted lens can handle at least 3-Megapixel resolution in the presence of moderate drift.

IV. Conclusion

It should be clear that the above-described embodiments, provide a system that is particularly useful for imaging a small feature (or feature set), such as an ID code, over a relatively large distance. The effect of the variable lens assembly is weakened using the positive lens assembly according to an embodiment. This arrangement is acceptable within the desired operational range and feature size. In further embodiments, the (e.g. removable) lens arrangement places the variable lens behind the fixed optical components, which generate the reduced drift characteristic. The variable lens, thus provides the rearmost optical component of the arrangement before the sensor. The variable lens can be included in the lens arrangement/housing, or can be part of the camera assembly.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Also, while the depicted lens assembly is incorporated in a removable lens unit, it is contemplated that the system can be employed in a fixed and/or permanently mounted lens. Likewise, while the above-described lens sizes and spacing distances are employed for the exemplary operational range, such sizes and distances can be scaled upwardly or downwardly in arrangements that have similar relative parameters but a larger or smaller overall size. Additionally, where a "lens assembly" is employed and/or described herein, it can consist of one or more discrete lenses that provide a desired optical effect. Accordingly, this description is meant to be taken only by way of example, and not to otherwise limit the scope of this invention.

What is claimed is:

1. A vision system that compensates for an effect of drift in a variable lens assembly, comprising:
    an image sensor operatively connected to a vision system processor;
    a variable lens assembly that varies a shape or a refractive index thereof; and
    a fixed lens assembly configured to weaken an effect of the variable lens assembly over a predetermined operational range of the object from the fixed lens assembly,
    wherein the fixed lens assembly and the variable lens assembly are part of an overall lens assembly focusing light on the image sensor and an optical power of the fixed lens assembly predominantly defines an overall optical power of the overall lens assembly thereby compensating for the effect of drift in the variable lens assembly,
    wherein the fixed lens assembly comprises one of: (a) a front lens with a front concave surface and a rear convex surface and a central biconvex lens spaced from the front lens, (b) a front biconvex lens and a rear stacked lens assembly with a front positive lens, center biconcave lens and rear positive lens, (c) a front planoconcave lens and a negative lens, a central stacked lens assembly with a biconvex lens and a planoconvex lens, and a rear biconvex lens and positive lens, (d) a front planoconvex lens and positive lens and a rear positive lens and negative lens, or (e) a front stacked lens assembly with a biconvex lens and biconcave lens and a rear planoconvex lens and negative lens.

2. The vision system a set forth in claim 1 wherein the variable lens assembly comprises a liquid lens assembly.

3. The vision system as set forth in claim 2 wherein the liquid lens assembly is variable over 20 diopter.

4. The vision system as set forth in claim 1 wherein the fixed lens assembly defines a positive optical power.

5. The vision system as set forth in claim 1 wherein the fixed lens assembly and the variable lens assembly are housed in a removable lens barrel with respect to a camera assembly body and the image sensor, the image sensor being located within the camera assembly body.

6. The vision system as set forth in claim 5 wherein the camera assembly body is electrically connected to the variable lens assembly, to provide at least one of power and control thereof, by at least one of contact pads and a cable assembly.

7. The vision system as set forth in claim 1 at least one lens of the fixed lens assembly comprises a polymer material.

8. The vision system as set forth in claim 1 wherein the fixed lens assembly defines an effective usable focal range of between 0.3 to 8 meters.

9. The vision system as set forth in claim 8 wherein the focal point is one of either a front focal point or a back focal point of the fixed lens assembly.

10. The vision system as set forth in claim 1 wherein the variable lens assembly is located adjacent to a focal point of the fixed lens assembly.

11. The vision system as set forth in claim 1 wherein the fixed lens assembly comprises a front lens assembly and a rear lens assembly with the variable lens assembly positioned therebetween.

12. The vision system as set forth in claim 11 wherein the rear lens assembly defines a positive optical power.

13. The vision system as set forth in claim 11 wherein the front lens assembly has a pair of lenses each having convex front surfaces and concave rear surfaces and a lens having opposing concave surfaces, and the rear lens assembly has a lens having opposing convex surfaces.

14. A variable lens system that compensates for an effect of drift in a variable lens assembly for a vision system having an image sensor that transmits image data to a processor comprising:
    a variable lens assembly; and
    a fixed lens assembly having a focal point, the variable lens assembly being located adjacent to the focal point,
    wherein the fixed lens assembly and the variable lens assembly are part of an overall lens assembly focusing light on the image sensor and an optical power of the positive lens assembly predominantly defining an overall optical power of the overall lens assembly thereby compensating for the effect of drift in the variable lens assembly, wherein the fixed lens assembly comprises one of: (a) a front lens with a front concave surface and a rear convex surface and a central biconvex lens spaced from the front lens, (b) a front biconvex lens and a rear stacked lens assembly with a front positive lens, center biconcave lens and rear positive lens, (c) a front plano-concave lens and a negative lens, a central stacked lens assembly with a biconvex lens and a planoconvex lens, and a rear biconvex lens and positive lens, (d) a front planoconvex lens and positive lens and a rear positive lens and negative lens, or (e) a front stacked lens assembly with a biconvex lens and biconcave lens and a rear planoconvex lens and negative lens.

15. The lens system a set forth in claim 14 wherein the variable lens assembly comprises a liquid lens assembly.

16. The lens system as set forth in claim 15 wherein the liquid lens assembly is variable over 20 diopter.

17. The lens system as set forth in claim 14 wherein the fixed lens and the variable lens assembly are housed in a removable lens barrel with respect to a camera assembly body and the image sensor, the image sensor being located within the camera assembly body.

18. The lens system as set forth in claim 17 wherein the camera assembly body is electrically connected to the variable lens assembly, to provide at least one of power and control thereof, by at least one of contact pads and a cable assembly.

19. A vision system that compensates for an effect of thermal drift in a variable lens assembly, comprising:

an image sensor operatively connected to a vision system processor;

a variable lens assembly that varies a shape or a refractive index thereof; and a fixed lens assembly configured to weaken an effect of the variable lens assembly over a predetermined operational range of the object from the fixed lens assembly, wherein the fixed lens assembly and the variable lens assembly are part of an overall lens assembly focusing light on the image sensor and an optical power of the fixed lens assembly predominantly defines an overall optical power of the overall lens assembly thereby compensating for the effect of thermal drift in the variable lens assembly, wherein the fixed lens assembly comprises one of: (a) a front lens with a front concave surface and a rear convex surface and a central biconvex lens spaced from the front lens, (b) a front biconvex lens and a rear stacked lens assembly with a front positive lens, center biconcave lens and rear positive lens, (c) a front plano-concave lens and a negative lens, a central stacked lens assembly with a biconvex lens and a planoconvex lens, and a rear biconvex lens and positive lens, (d) a front planoconvex lens and positive lens and a rear positive lens and negative lens, or (e) a front stacked lens assembly with a biconvex lens and biconcave lens and a rear planoconvex lens and negative lens.

* * * * *